United States Patent
Shimazu et al.

(10) Patent No.: US 12,136,041 B2
(45) Date of Patent: Nov. 5, 2024

(54) DETECTION DEVICE, DETECTION METHOD, GENERATION METHOD, COMPUTER PROGRAM, AND STORAGE MEDIUM

(71) Applicant: SHIMANO Inc., Sakai (JP)

(72) Inventors: Hayato Shimazu, Sakai (JP); Kozo Chikai, Sakai (JP); Katsuo Nakamura, Sakai (JP); Kenji Tagawa, Sakai (JP); Shou Tanaka, Sakai (JP); Yasuhiro Nakashima, Sakai (JP); Noriko Masuta, Sakai (JP); Yasuho Hommoto, Sakai (JP)

(73) Assignee: Shimano Inc., Sakai (JP)

( * ) Notice: Subject to any disclaimer, the term of this patent is extended or adjusted under 35 U.S.C. 154(b) by 212 days.

(21) Appl. No.: 16/900,695

(22) Filed: Jun. 12, 2020

(65) Prior Publication Data
US 2020/0394407 A1     Dec. 17, 2020

(30) Foreign Application Priority Data
Jun. 14, 2019   (JP) ................. 2019-111494

(51) Int. Cl.
| | |
|---|---|
| G06T 7/70 | (2017.01) |
| B62J 50/20 | (2020.01) |
| G06F 18/21 | (2023.01) |
| G06N 3/088 | (2023.01) |
| G06N 20/00 | (2019.01) |
| G06V 10/70 | (2022.01) |
| G06V 20/20 | (2022.01) |

(52) U.S. Cl.
CPC .............. *G06N 3/088* (2013.01); *B62J 50/20* (2020.02); *G06F 18/21* (2023.01); *G06N 20/00* (2019.01); *G06T 7/70* (2017.01); *G06V 10/70* (2022.01); *G06V 20/20* (2022.01)

(58) Field of Classification Search
CPC ....... G06V 20/20; B62J 50/20; G06K 9/6217; G06K 9/6268; G06N 20/00; G06N 3/0454; G06N 3/088; G06N 3/0445; G06N 3/08; G06T 7/70; G06T 7/0004; G06T 2207/20081; G06T 2207/20084
See application file for complete search history.

(56) References Cited

U.S. PATENT DOCUMENTS

| | | |
|---|---|---|
| 7,819,032 B2 | 10/2010 | Watari et al. |
| 9,227,697 B2 | 1/2016 | Matsumoto et al. |

(Continued)

FOREIGN PATENT DOCUMENTS

| | | |
|---|---|---|
| JP | 2002370630 A | 12/2002 |
| JP | 2005004489 A | 1/2005 |

(Continued)

*Primary Examiner* — Ming Y Hon
(74) *Attorney, Agent, or Firm* — Alleman Hall & Tuttle LLP

(57) ABSTRACT

Provided are a detecting device, a detecting method, a generating method, and a computer-readable storage medium that allow the user to readily obtain information on an object related to a human-powered vehicle. The detecting device includes a control unit that detects an object related to a human-powered vehicle as a target object from a first image including at least a part of the human-powered vehicle, and outputs related information related to the target object.

30 Claims, 23 Drawing Sheets

(56) References Cited

U.S. PATENT DOCUMENTS

| | | | |
|---|---|---|---|
| 10,360,452 B2* | 7/2019 | Kim | G06T 11/60 |
| 10,680,500 B2* | 6/2020 | Shahi | H02K 11/35 |
| 2012/0130521 A1* | 5/2012 | Kohlhoff | G06T 19/00 700/98 |
| 2013/0027052 A1* | 1/2013 | Matsumoto | B62J 50/21 324/511 |
| 2014/0052327 A1* | 2/2014 | Hosein | G06F 16/9535 701/29.4 |
| 2014/0358298 A1* | 12/2014 | Hall | G01B 11/272 700/279 |
| 2015/0180999 A1* | 6/2015 | Pisz | G02B 27/01 709/204 |
| 2017/0053533 A1* | 2/2017 | Kuroda | G08G 1/167 |
| 2017/0308751 A1* | 10/2017 | Kim | G06V 40/19 |
| 2018/0048850 A1* | 2/2018 | Bostick | G06V 20/56 |
| 2018/0121763 A1* | 5/2018 | Surnilla | G08G 1/167 |
| 2019/0012802 A1 | 1/2019 | Liu et al. | |
| 2019/0368223 A1* | 12/2019 | Liu | E05B 15/16 |
| 2019/0370544 A1* | 12/2019 | Wright, Jr. | G06Q 10/20 |
| 2019/0392242 A1* | 12/2019 | Tariq | G06K 9/627 |
| 2020/0162679 A1* | 5/2020 | Ahn | G06T 11/60 |
| 2020/0242750 A1* | 7/2020 | Kokkula | G06V 10/75 |
| 2020/0250890 A1* | 8/2020 | Zhou | G06T 7/55 |
| 2020/0285910 A1* | 9/2020 | Steelberg | G06V 20/584 |
| 2020/0298757 A1* | 9/2020 | Thompson | G07C 5/0808 |
| 2021/0014411 A1* | 1/2021 | Chen | G06V 20/70 |
| 2021/0263962 A1* | 8/2021 | Chang | G06V 10/82 |
| 2022/0051028 A1* | 2/2022 | Nakano | G08G 1/0175 |
| 2022/0091837 A1* | 3/2022 | Chai | G06F 8/36 |
| 2022/0097732 A1* | 3/2022 | Cunningham | B60W 60/0027 |
| 2022/0300998 A1* | 9/2022 | Glazier | H04L 67/535 |

FOREIGN PATENT DOCUMENTS

| | | |
|---|---|---|
| JP | 2005078586 A | 3/2005 |
| JP | 2005302919 A | 10/2005 |
| JP | 2015005172 A | 1/2015 |
| WO | 2017217032 A1 | 12/2017 |

* cited by examiner

DETECTION DEVICE, DETECTION METHOD, GENERATION METHOD, COMPUTER PROGRAM, AND STORAGE MEDIUM

CROSS-REFERENCE TO RELATED APPLICATIONS

The subject application claims priority to Japanese Pat. App. Ser. No. 2019-111494, filed Jun. 14, 2019, the entire contents of which are hereby incorporated by reference for all purposes.

TECHNICAL FIELD

The present invention relates to a detecting device, a detecting method, a generating method, and a computer-readable storage medium that detect a part of a human-powered vehicle from an image.

BACKGROUND ART

Human-powered vehicles mounted with components including a front derailleur, a rear derailleur, a seat post, a suspension, or the like have been known. A technique of making a diagnosis by connecting a diagnostic device to the component of the human-powered vehicle has been known (see Patent Documents 1 and 2).

PRIOR ART DOCUMENT

Patent Document

[Patent Document 1] U.S. Pat. No. 7,819,032
[Patent Document 2] U.S. Pat. No. 9,227,697

SUMMARY OF INVENTION

Problems to be Solved by Invention

Currently, there is a need to provide a means for allowing a user to more readily obtain information related to human-powered vehicles.

It is an object of the present invention to provide a detecting device, a detecting method, a generating method, and a computer-readable storage medium that allow the user to readily obtain information on an object related to a human-powered vehicle.

Means for Solving Problems

A detecting device according to the first aspect of the present invention comprises a control unit configured to detect in a first image including at least part of a human-powered vehicle an object that is classified as a target object related to a human-powered vehicle, and output information related to the target object.

According to the present aspect, the user can readily obtain the information related to the human-powered vehicle from the image of the human-powered vehicle.

In a detecting device according to the second aspect of the present invention, the control unit detects the object by executing a machine learning model, the machine learning model having been trained on a training data set during a training phase, and being configured at run-time to receive the first image as input, and in response, outputs identification information that identifies the object as the target object and a confidence value of the identification of the object as the target object.

According to the present aspect, the identification information of the target object and the confidence value are output from the trained machine learning model in accordance with the input image, which enables detection of the target object with accuracy by machine learning.

In a detecting device according to the third aspect of the present invention, the object includes a component of the human-powered vehicle and the target object includes a target component, and the control unit detects the component of the human-powered vehicle as the target component in the first image.

According to the present aspect, the user can obtain the related information of the component included in the human-powered vehicle from the image of the human-powered vehicle.

In a detecting device according to the fourth aspect of the present invention, the control unit outputs the related information and a second image featuring the target component.

According to the present aspect, the user can easily recognize the target component and the related information.

In a detecting device according to the fifth aspect of the present invention, the related information includes component information related to the target component.

According to the present aspect, the user can more readily obtain the information related to the component, such as what the component included in the human-powered vehicle is, from the image including a part of the human-powered vehicle.

In a detecting device according to the sixth aspect of the present invention, the component information includes at least one of information on a type of the target component, a specification of the target component, an assembling method for the target component, an installing method for the target component, a disassembling method for the target component, an adjusting method for the target component, and a replacement for the target component.

According to the present aspect, the user can readily obtain information on at least one of the type, specification, assembling method, installing method, disassembling method and adjusting method for the component included in the human-powered vehicle as well as information on a replacement for the component from the image including a part of the human-powered vehicle.

In a detecting device according to the seventh aspect of the present invention, the information on an installing method includes at least one of information on a component for installing the target component in the human-powered vehicle and information on a tool required for installation of the target component.

According to the present aspect, the user can readily obtain information on an installation of the component included in the human-powered vehicle from the image of the human-powered vehicle.

In a detecting device according to the eighth aspect of the present invention, the information on a replacement includes information on another component required for the target component to be replaced with the replacement.

According to the present aspect, the user can readily obtain information on a replacement of the component included in the human-powered vehicle from the image of the human-powered vehicle.

In a detecting device according to the ninth aspect of the present invention, the control unit outputs information on an installed state of the target component detected in the human-powered vehicle According to the present aspect, the user can obtain the information on an installed state of the component included in the human-powered vehicle from the image of the human-powered vehicle.

In a detecting device according to the tenth aspect of the present invention, the target component is one of a plurality of target components detected by the control unit from the first image, and the control unit outputs information on a matching state among the plurality of target components as the related information.

According to the present aspect, the user can obtain the information on the matching between the multiple components included in the human-powered vehicle from the image of the human-powered vehicle.

In a detecting device according to the eleventh aspect of the present invention, the object includes a frame of the human-powered vehicle, and the control unit detects the frame as a target frame in the first image.

According to the present aspect, the user can obtain the information related to the frame included in the human-powered vehicle from the image of the human-powered vehicle.

In a detecting device according to the twelfth aspect of the present invention, the control unit outputs the related information and a third image featuring the target frame.

According to the present aspect, the user can easily recognize the detected frame and the related information.

In a detecting device according to the thirteenth aspect of the present invention, the control unit outputs information on a component to be recommended in accordance with the target frame, and user information including at least one of physical information and attribute information of a user of the human-powered vehicle as the related information.

According to the present aspect, the user can obtain the information on the frame and component that are fit for the body of the user himself from the image of the human-powered vehicle.

In a detecting device according to the fourteenth aspect of the present invention, the physical information includes information on a position of a joint of the user.

According to the present aspect, the user can obtain the information on the frame and component that are fit for the body of the user himself in accordance with the image of the human-powered vehicle and the position of the joint of the user.

In a detecting device according to the fifteenth aspect of the present invention, the control unit outputs the related information as at least one of a text data and graphical data.

According to the present aspect, the user can obtain the related information as text data or graphical data from the image of the human-powered vehicle.

A detecting device according to the sixteenth aspect of the present invention comprises a display unit that displays information output from the control unit.

According to the present aspect, the user can visually recognize the target object and the related information.

In a detecting device according to the seventeenth aspect of the present invention, the display unit accepts input of selecting the related information as related information to be selected, and the control unit outputs detailed information of the related information to be selected.

According to the present aspect, the user can select which one of the related information is to be displayed in a more detailed manner regarding the related information related to the object detected from the image of the human-powered vehicle, and obtain the detailed information.

In a detecting device according to the eighteenth aspect of the present invention, the display unit is configured to receive a user selection of the target component in the second image, and in response to the user selection, the control unit outputs information related to the target component.

According to the present aspect, the user can select the component about which the related information is to be displayed regarding the information related to the component detected from the image of the human-powered vehicle.

A detecting device according to the nineteenth aspect of the present invention comprises a non-volatile storage device in communication with the processing circuitry, the non-volatile storage device being configured to store information output from the processing circuitry of the control unit.

According to the present aspect, the detecting device can store the information related to the target object included in the human-powered vehicle.

In a detecting device according to the twentieth aspect of the present invention, the control unit stores the identification information of the target object in the storage device in association with the related information.

According to the present aspect, the detecting device can store the identification information of the target object and the related information.

In a detecting device according to the twenty-first aspect of the present invention, the control unit stores identification information of the target object in the storage device in association with identification information of the user of the human-powered vehicle.

According to the present aspect, the detecting device can store the identification information of the target object in the image of the human-powered vehicle in association with the information identifying the user.

In a detecting device according to the twenty-second aspect of the present invention, the control unit outputs the identification information of the detected target object in association with the related information to an external device.

According to the present aspect, the detecting device can output the identification information of the detected target object in the image of the human-powered vehicle to an external device, such as a cloud server, for example.

In a detecting device according to the twenty-third aspect of the present invention, the control unit outputs the identification information of the target object in association with the identification information of the user of the human-powered vehicle to an external device.

According to the present aspect, the detecting device can output the identification information of the target object in the image of the human-powered vehicle in association with the information identifying the user to the external device, such as a cloud server, for example.

In a detecting device according to the twenty-fourth aspect of the present invention, the control unit outputs information for prompting the user to input the first image in accordance with a traveling history of the human-powered vehicle.

According to the present aspect, the user can more surely obtain the related information of an object related to the human-powered vehicle.

In a detecting device according to the twenty-fifth aspect of the present invention, the control unit outputs the first image in association with the traveling history of the human-powered vehicle to an external device.

According to the present aspect, the detecting device can output the image of the human-powered vehicle to an external device, such as a cloud server, for example.

In a detecting device according to the twenty-sixth aspect of the present invention, the control unit outputs the first image in association with traveling environment information indicating traveling environment of the human-powered vehicle to an external device.

According to the present aspect, the detecting device can output the image in association with traveling environment information indicating traveling environment of the human-powered vehicle to an external device, such as a cloud server, for example.

In a detecting device according to the twenty-seventh aspect of the present invention, a training computer trains the machine learning model using training data including labeled images, each of the labeled images including pixel data showing a part of the human-powered vehicle and being labeled with identification information of a target object shown in each of the images, the images having been collected through the Internet.

According to the present aspect, the learning model is trained to detect an object related to the human-powered vehicle with accuracy in accordance with a great number of images of the human-powered vehicle collected via the Internet.

In a detecting device according to the twenty-eighth aspect of the present invention, a training computer trains the machine learning model using training data including rendered images generated by an application program of designs relating to at least one of a frame and a component of the human-powered vehicle, and identification information associated with a target object for each of the rendered images.

According to the present aspect, the learning model is trained to detect an object related to the human-powered vehicle with accuracy in accordance with images of the human-powered vehicle created according to the application program for design.

In a detecting device according to the twenty-ninth aspect of the present invention, a training computer trains the machine learning model using training data including a plurality of images obtained when at least one of a frame and a component of the human-powered vehicle is viewed from a plurality of different angles.

According to the present aspect, the detecting device can generate the trained machine learning model such that an object related to the human-powered vehicle is detected in accordance with multiple images related to the human-powered vehicle.

In a detecting device according to the thirtieth aspect of the present invention, the control unit, upon determining that the confidence value that is output from the learning model is equal to or less than a predetermined value, outputs a plurality of identification information candidates of the object in descending order of the confidence value of each, receives a user selection of one of the plurality of the identification information candidates, and retrains the learning model by a fourth image labeled with the selected identification information candidate.

According to the present aspect, if the confidence value that is output from the learning model in accordance with the image is equal to or less than the predetermined value, selection of an identification information candidate is accepted to retrain the learning model, which enhances the detection accuracy.

The present invention may be achieved as a detecting device having the above-described characteristic elements described above as well as a detecting method of executing each characteristic processing, a computer including a processor to execute such characteristic processing, a method for generating a trained machine learning model, and a computer-readable storage medium.

A detection method executable by a processor according to the thirty-first aspect of the present invention comprises: detecting an object related to a human-powered vehicle as a target object in a first image including at least a part of the human-powered vehicle; and outputting information related to the target object.

According to the present aspect, the user can readily obtain the related information of the human-powered vehicle from the image of the human-powered vehicle.

A method for generating a learning model according to the thirty-second aspect of the present invention comprises: creating training data obtained by labeling a plurality of first images each including at least a part of a human-powered vehicle with identification information of objects related to the human-powered vehicle, and generating a learning model based on the created training data that detects, in accordance with input of an image, an object related to the human-powered vehicle as a target object in the image, and outputs identification information of the target object and a confidence value.

According to the present aspect, the detecting device can generate the trained machine learning model such that an object related to the human-powered vehicle is detected in accordance with multiple images related to the human-powered vehicle.

A computer-readable storage medium according to the thirty-third aspect of the present invention comprises instructions configured to be executed by a processor of a computer, the instructions including: detecting an object related to a human-powered vehicle as a target object in a first image including at least a part of the human-powered vehicle and outputting information related to the target object.

According to the present aspect, the user can readily obtain the related information of the human-powered vehicle from the image of the human-powered vehicle.

Effects of Invention

The detecting device according to the present invention allows the user to readily obtain the related information of the human-powered vehicle from the image of the human-powered vehicle without a special diagnostic device.

MODE FOR CARRYING OUT INVENTION

The descriptions of the embodiments below are examples of forms that an output device according to the present invention can take, though there is no intention to limit the forms. The output device according to the present invention can take forms different from the embodiments, such as forms of modification of each of the embodiments and a combination of at least two modifications that do not contradict each other.

In the following description of each of the embodiments, the terms indicating directions, such as front, back, forward, backward, left, right, sideways, upper, lower and so on are used with reference to the directions seen as the user sits in the saddle of a human-powered vehicle.

Embodiment 1

Figure 1:
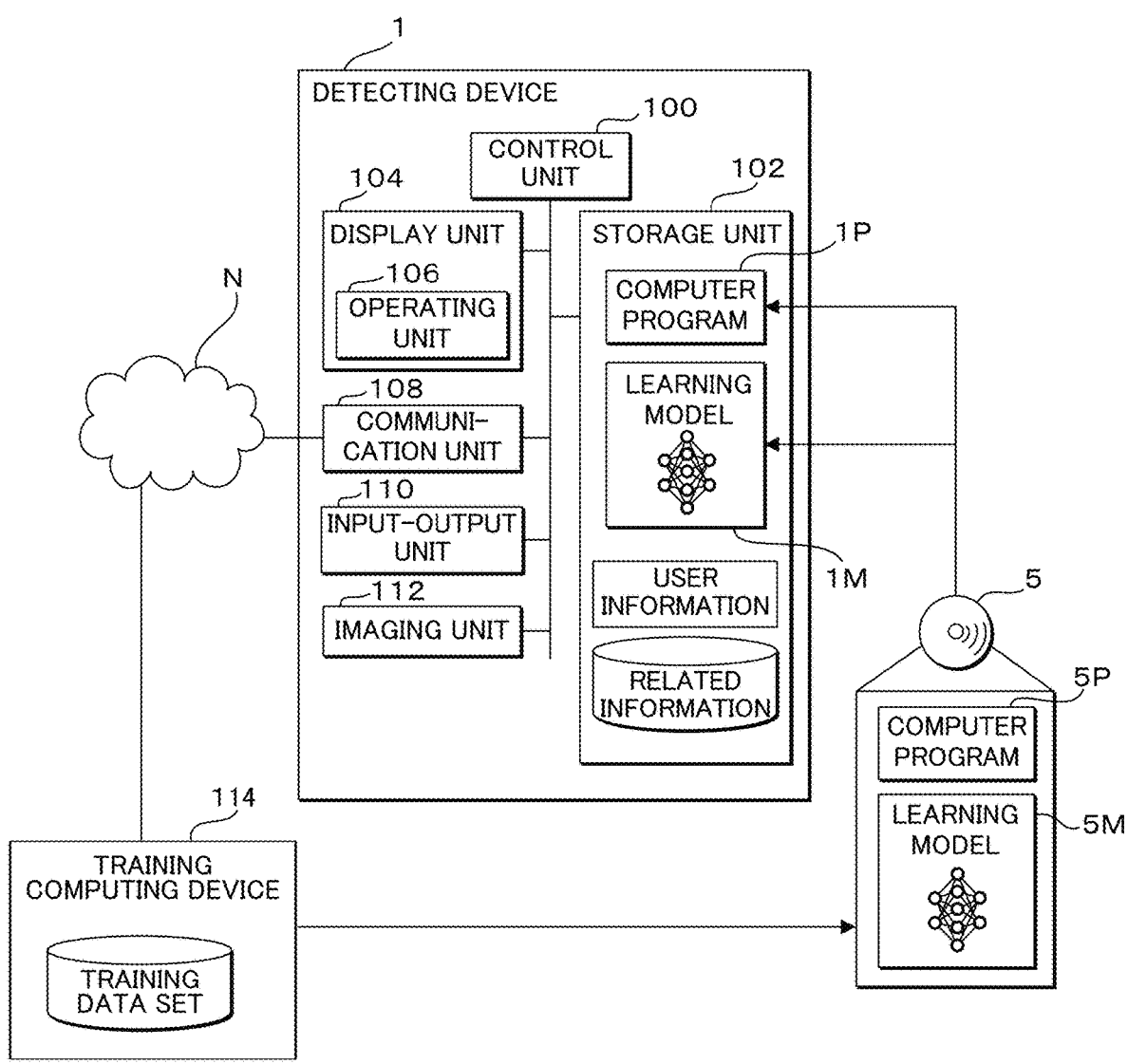
FIG. 1 is a block diagram illustrating the configuration of a detecting device in Embodiment 1.

FIG. 1 is a block diagram illustrating the configuration of a detecting device 1 in Embodiment 1. The detecting device 1 is a smartphone in the first example. The detecting device 1 is a tablet terminal in the second example. The detecting device 1 includes a control unit 100, a storage device (storage unit) 102, a display unit 104, a communication unit 108, an input-output unit 110 and an imaging unit 112.

The control unit 100 includes processing circuitry, e.g. a processor utilizing a central processing unit (CPU) and/or a graphic processing unit (GPU). The control unit 100 executes processing by using a memory such as a built-in read only memory (ROM), a random access memory (RAM) and so on. The detecting device 1 detects an object related to a human-powered vehicle as a target object in a first image including at least a part of the human-powered vehicle, and outputs the related information related to the target object.

The storage device 102 includes a non-volatile memory, such as a flash memory, for example. The storage device 102 stores a computer program 1P. The control unit 100 reads out and executes the computer program 1P. The computer program 1P is provided from a parts maker of the human-powered vehicle or is delivered from any distribution server, and is installed into the detecting device 1, which is a general purpose computer. The computer program 1P causes the computer to execute processing of detecting an object related to the human-powered vehicle as a target object from a first image including at least a part of the human-powered vehicle, and outputting the related information related to the target object. The computer program 1P may be obtained by the control unit 100 reading out a computer program 5P stored in a computer-readable storage medium 5 and copying it onto the storage device 102.

The storage device 102 stores a machine learning model 1M. The learning model 1M is trained on a training data set during a training phase by a training computer 114. Although training computer 114 is depicted as a separate computing device from detecting device 1, it will be appreciated that in some configurations these two devices could be the same computing device. The learning model 1M is trained to output the identification information of the target object and a confidence value, that is, an estimated degree of accuracy in the classification predicted by the learning model, of being the target object, in accordance with input of an image. The control unit 100 is configured to detect an object that is classified as a target object related to the human-powered vehicle by executing the trained machine learning model 1M. The learning model 1M may be obtained by the control unit 100 receiving a learning model 5M stored in the storage medium 5 and copying it onto the storage device 102. Although the storage medium 5 is depicted as a CD-ROM obtained from the training computer as a data source, it will be appreciated that it may be any suitable non-volatile storage device, such as FLASH memory, etc. Further, the learning model 5M and computer program 5P may alternatively be stored at and downloaded from a server device such as training computer 114 via a computer network N, instead of being installed using storage media 5. At run-time, which is the time at which a user employs the trained machine learning model on the detecting device 1 to recognize objects in an image of the human powered vehicle, the control unit 100 is configured to receive a first image as input and output identification information that identifies the object as the target object and a confidence value of the identification of the object as the target object. This output may also be stored in storage unit 102, and exported to other computing devices via storage media 5 or computer network N.

In Embodiment 1, the object includes a component of the human-powered vehicle. The control unit 100 thus detects a component of the human-powered vehicle as a target component from the first image.

The storage device 102 stores in advance related information including component information related to the detected component. In the first example, the component information is a type of a component that is associated with the identification information of each component of the human-powered vehicle and includes a name indicating the type. In the second example, the component information is information on a specification of each component that is associated with the identification information identifying the model number of a component. In the third example, the component information is information on an assembling method for each component that is associated with the identification information identifying the model number of a component. In the fourth example, the component information is information on an installing method for each component that is associated with the identification information identifying the model number of a component. In the fifth example, the component information is information on a disassembling method for each component that is associated with the identification information identifying the model number of a component. In the sixth example, the component information is information on an adjusting method for each component that is associated with the identification information identifying the model number of a component. In the seventh example, the component information is information on a replacement for each component that is associated with the identification information identifying the model number of a component. A part or all of them may be included in the related information. The related information may be incorporated in the computer program 1P.

The information on the installing method includes at least one of the information on a component for installing a target component in the human-powered vehicle and the information on a tool that is required for the installation of the target component. The information on a replacement includes information on another component that is required when the target component is replaced with such a replacement.

The storage device 102 stores information to be output by the control unit 100 besides the information stored in advance. The storage device 102 stores related information related to the detected human-powered vehicle. The storage device 102 stores identification information of the user. The identification information of the user includes, for example, a name, a nickname, a user ID, an e-mail address, etc. The storage device 102 stores user information related to the user. The user information includes at least one of physical information and attribute information of the user of the human-powered vehicle. The physical information includes the height and weight of the user, for example. The physical information may include the position of a joint of the user. The attribute information includes information related to a riding style and a life style favored by the user, for example.

The display unit 104 is a display device such as a liquid crystal panel, an organic electroluminescent display, or the like. The display unit 104 displays information to be output from the control unit 100. In Embodiment 1, the display unit 104 displays the related information related to a part of the human-powered vehicle together with the image of the human-powered vehicle imaged by the imaging unit 112.

The display unit 104 includes an operating unit 106 that is an interface for accepting operation input performed by the user. In the present embodiment, the operating unit 106 is a touch panel device included in the display unit 104. The operating unit 106 may be a physical button, a microphone, or the like.

The communication unit 108 is a communication module that can connect to communicate with a public communication network N. The control unit 100 can output information to an external device via the communication unit 108.

The input-output unit 110 is an interface to be connected to an external storage device or communication equipment. The input-output unit 110 is, for example, a universal serial bus (USB) interface.

The imaging unit 112 includes an image pickup device such as a complementary MOS (CMOS) image sensor, or the like. The imaging unit 112 outputs an image generated by the image pickup device when activated. The imaging unit 112 generates a still image or a dynamic image in accordance with an instruction from the control unit 100.

The control unit 100 in Embodiment 1 detects a component of the human-powered vehicle by using the learning model 1M. The control unit 100 inputs a first image obtained by imaging the human-powered vehicle to the learning model 1M, detects the shown human-powered vehicle as well as the component and frame of the human-powered vehicle, and outputs the related information related to the detected component, frame, etc. Detection processing using the learning model 1M will be described in detail below.

Figure 2:
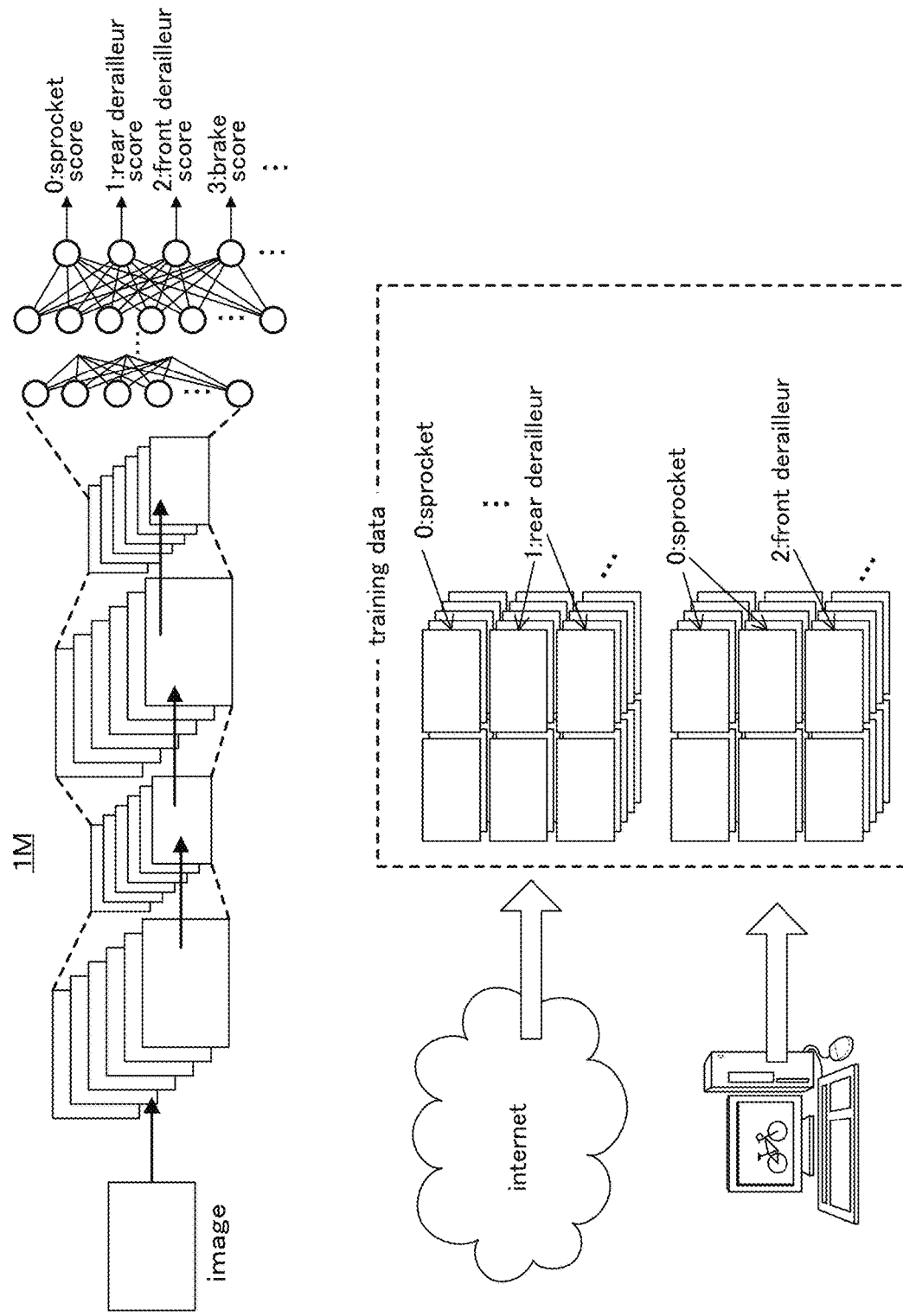
FIG. 2 illustrates the outline of a learning model in Embodiment 1.

FIG. 2 illustrates the outline of the learning model 1M. The learning model 1M is trained to output the identification information of an object related to the human-powered vehicle and the degree of accuracy, i.e. confidence value, of the object as the target object, in accordance with input of the first image including at least a part of the human-powered vehicle. As illustrated in FIG. 2, the learning model 1M outputs the identification information of an object related to the human-powered vehicle together with a score indicating the degree of accuracy by a supervised deep learning algorithm using a neural network (hereinafter referred to as NN). The learning algorithm for the learning model 1M may be an unsupervised learning algorithm or a recurrent neural network (RNN).

As illustrated in FIG. 2, the NN of the learning model 1M includes multiple convolutional layers, multiple pooling layers and multiple fully connected layers that are defined by definition data, classifies the object shown in the inputted first image in accordance with the feature of the inputted first image, and outputs identification information identifying the classification result and the degree of accuracy thereof.

The learning model 1M is trained using training data obtained by labeling first images each including a part of the human-powered vehicle collected via the Internet with identification information of an object shown in each of the first images in the model creating device managed by the business operator of the human-powered vehicle. More specifically, the learning model 1M is generated according to a creating method of creating training data obtained by labeling multiple first images each including at least a part of the human-powered vehicle with the identification information of objects related to the human-powered vehicle, detecting, in accordance with input of an image, an object related to the human-powered vehicle as a target object from the image, and outputting the identification information of the object related to the human-powered vehicle and the degree of accuracy using the created training data.

The learning model 1M may be trained in advance by training data based on rendering images generated according to an application program for design related to at least one of the frame and component of the human-powered vehicle by the model creating device managed by the business operator of the human-powered vehicle. Even if the rendering image is used for the training data, the training data is created by being labeled with the identification information of an object. The application program for design is a three-dimensional computer aided design (CAD).

The learning model 1M may be trained in advance by the training data including multiple images obtained when at least one of the frame and component of the human-powered vehicle is viewed from multiple different angles, by the model creating device managed by the business operator of the human-powered vehicle.

In the first example, the identification information of the object that is to be labeled with the image of the training data is information identifying the type of a component of the human-powered vehicle. In FIG. 2, the first image including a sprocket is labeled with "0," the first image including a rear derailleur is labeled with "1," and the first image including a front derailleur is labeled with "2."

In the second example, the identification information of the object that is to be labeled with the image of the training data is a model number of each component or the frame of the human-powered vehicle. In the second example, the first images each including a component or the frame that are labeled with respective model numbers are used as training data.

The detecting processing using the learning model 1M illustrated in FIG. 2 will be described with reference to a flowchart.

The learning model 1M is assumed to be trained such that the identification information of a component corresponding to a model number is outputted.

Figure 3:
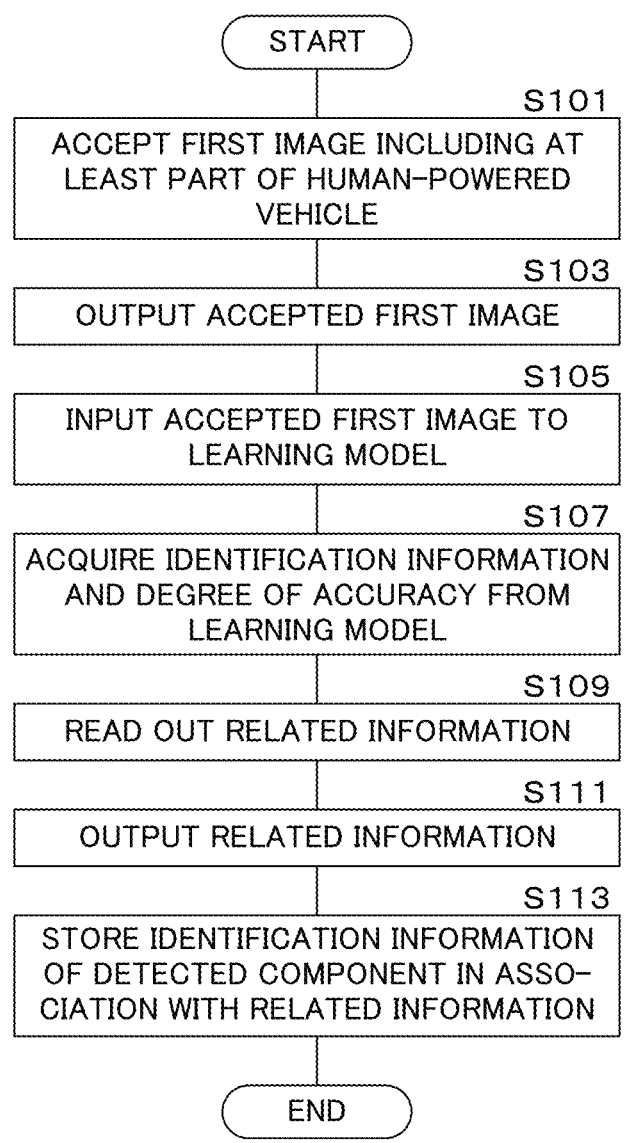
FIG. 3 is a flowchart showing one example of a detecting method for a component by the detecting device using the learning model in Embodiment 1.

FIG. 3 is a flowchart showing one example of a detecting method for a component by the detecting device 1 using the learning model 1M. When the user carrying the detecting device 1, which is a smartphone, or a maintenance staff for the human-powered vehicle carrying the detecting device 1 activates the computer program 1P, the control unit 100 executes the following processing.

The control unit 100 accepts a first image including a human-powered vehicle (step S101). At step S101, the control unit 100 activates the imaging unit 112 to accept image output. Alternatively, having stored first images acquired by the imaging unit 112 in advance in the storage device 102, the control unit 100 may read out a selected one of the first images from the storage device 102 to accept the first image at step S101.

The control unit 100 outputs the accepted first image (step S103). At step S103, the control unit 100 causes the display unit 104 to display the first image.

The control unit 100 inputs the accepted first image to the trained learning model 1M (step S105). The learning model 1M detects a component in accordance with the input of the first image, and outputs the identification information corresponding to the model number of the target component and the degree of accuracy. The control unit 100 acquires the identification information and the degree of accuracy that are output from the learning model 1M (step S107). By steps S105 and S107, the control unit 100 detects the component of the human-powered vehicle as a target component.

The control unit 100 reads out related information including component information related to the target component from the storage device 102 (step S109) and outputs the related information that is read out (step S111). At step S109, the control unit 100 outputs the related information to the display unit 104. The control unit 100 outputs the related information as at least one of text data and graphical data, such as a character string or an image. The display unit 104 is configured to display text data indicating the related information is superimposed on the first image that has been displayed at step S103. The related information may be output to the external device via the input-output unit 110, or may be print output or voice output, not limited to be being output to the display unit 104.

At step S111, the control unit 100 outputs in a selectable manner the related information for each component and outputs detailed information of the related information for the selected component. The output example of the detailed information will be described in detail with reference to FIGS. 4 to 9.

The component information to be read out at step S109 is any of the information stored in the storage device 102 as related information. The component information to be read out may be all the information stored in the storage device 102 as related information.

The control unit 100 stores in the storage device 102 the identification information of the component detected at step S107 in association with the related information outputted at step S111 (step S113) and ends the processing.

Figure 4:
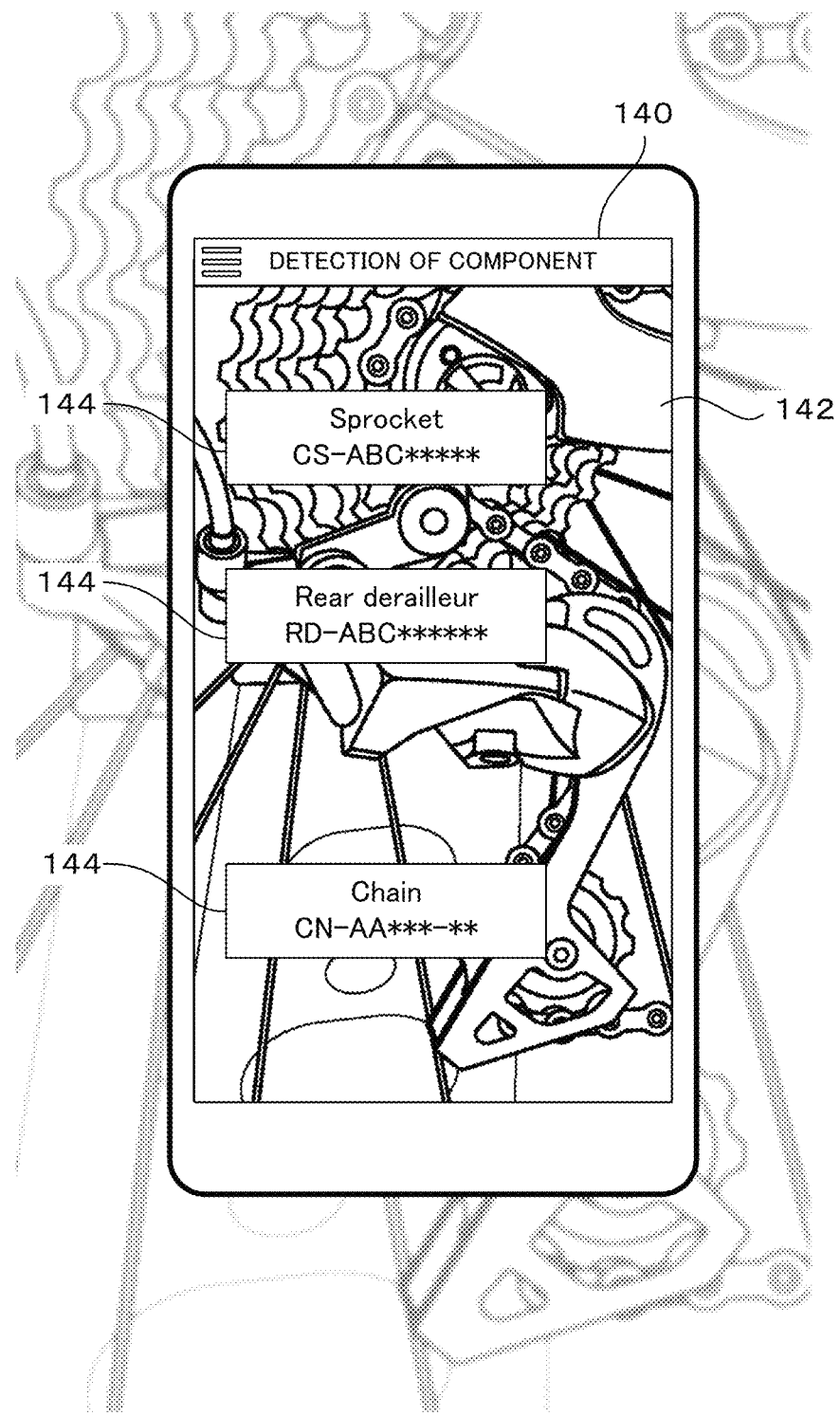
FIG. 4 illustrates an output example of related information displayed on a display unit of the detecting device in Embodiment 1.

FIG. 4 illustrates a display example of the related information displayed on the display unit 104 of the detecting device 1. FIG. 4 illustrates one example of an application screen 140 in accordance with the computer program 1P that is being displayed on the display unit 104. The application screen 140 includes the first image 142 displayed on the display unit 104 at step S103. On the application screen 140, each of the related information related to the target component is displayed as text data so as to be superimposed on the first image 142. In the example in FIG. 4, the related information is information indicating the model number of each component. The display unit 104 accepts input of selecting the related information as related information to be selected through the operating unit 106. The display unit 104 accepts the input of selecting the related information represented by text data as an object 144 on the application screen 140 illustrated in FIG. 4. In FIG. 4, the objects 144 of the selectable related information are represented by rectangular boxes.

The control unit 100 outputs the detailed information of the related information to be selected. More specifically, the control unit 100 outputs the detailed information to the display unit 104.

Figure 5:
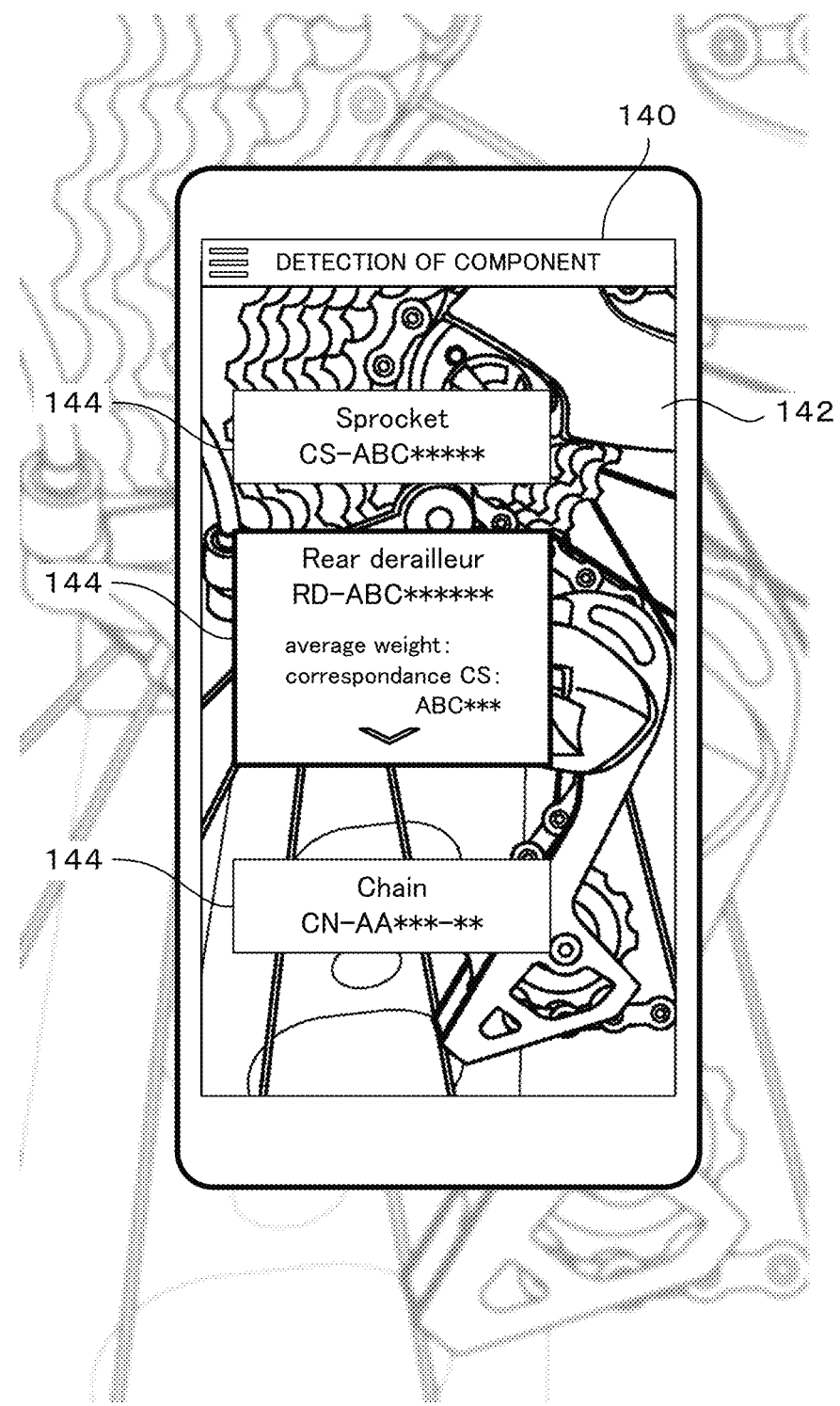
FIG. 5 illustrates another output example of the related information displayed on the display unit of the detecting device in Embodiment 1.

FIG. 5 illustrates a display example of the detailed information displayed on the display unit 104. As illustrated in FIG. 5, on the application screen 140, information on the specification of the component stored in the storage device 102 in association with the model number of the component is displayed so as to be superimposed on the first image 142 as detailed information of the target component corresponding to the selected object 144 represented by the bold box. On the application screen 140, information on a replacement for the component stored in the storage device 102 in association with the model number of the target component and on another component that is required upon replacement may be displayed.

Figure 6:
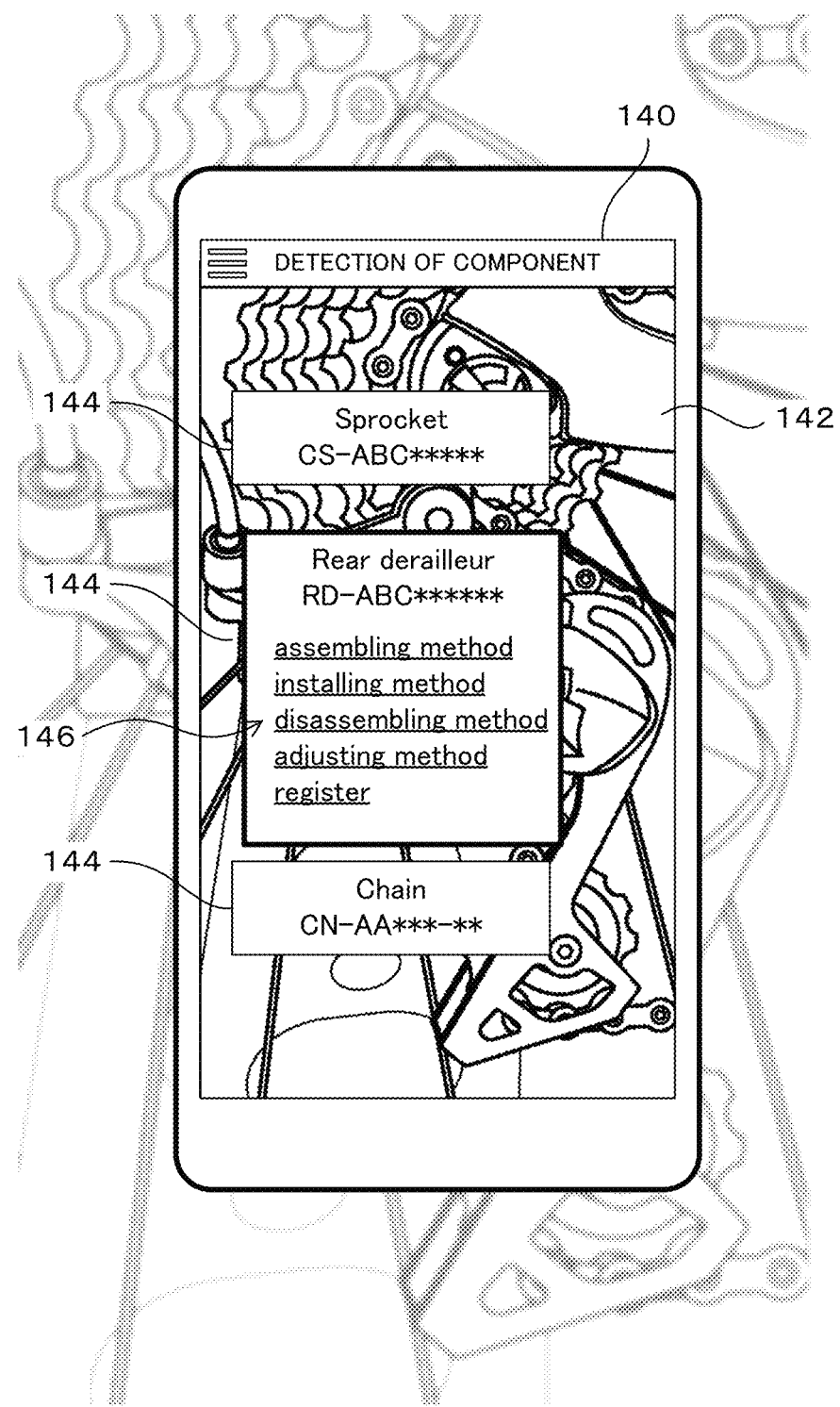
FIG. 6 illustrates still another output example of the related information displayed on the display unit of the detecting device in Embodiment 1.

FIG. 6 illustrates another display example of the related information displayed on the display unit 104 of the detecting device 1. FIG. 6 illustrates another display example when the object 144 is selected. On the application screen 140, information each indicating the model number of the component shown in the first image 142 is displayed as related information. The related information is displayed as a selectable object 144 similar to FIG. 4. If the user selects any one of the objects 144, for example, if the user taps on any one of the objects 144 on the application screen 140, a menu 146 is displayed as text data for the user to select at least any one of the "assembling method," "installing method," "disassembling method," "adjusting method" and "register" as related information of the component as illustrated in FIG. 6. If the "register" is selected, the identification information and attribute information of the user of the human-powered vehicle are accepted, and the type, model number and related information of the target component are stored in the storage device 102 in association with the identification information and attribute information of the user.

Figure 7:
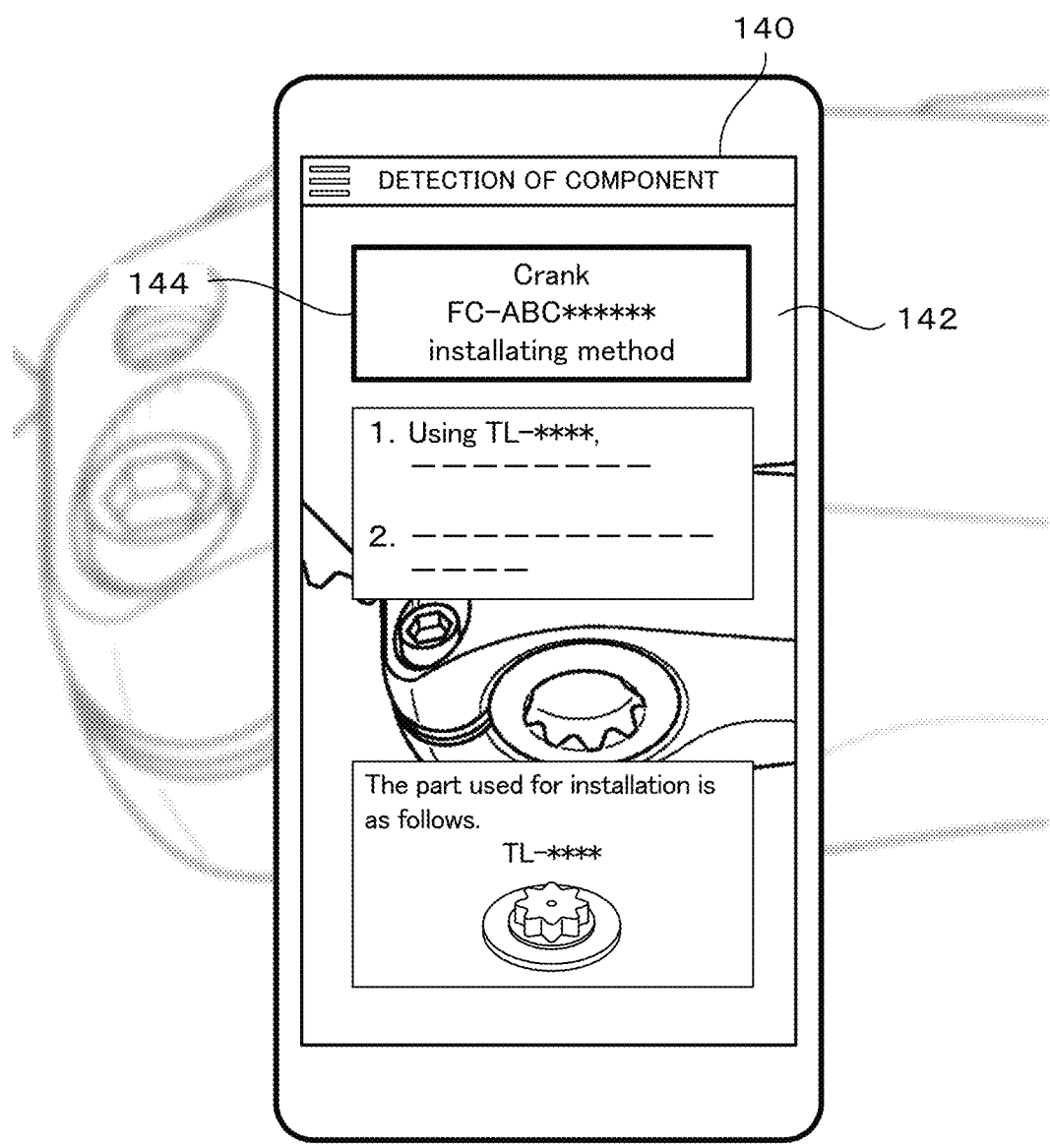
FIG. 7 illustrates a still another output example of the related information displayed on the display unit of the detecting device in Embodiment 1.

FIG. 7 illustrates another display example of the related information displayed on the display unit 104 of the detecting device 1. FIG. 7 is a display example displayed when the "installing method" is selected from the menu 146 displayed regarding the object 144 of the first image 142 showing a crank. The information on the "installing method" displayed when the "installing method" is selected includes at least one of the information on a component for installing the target component in the human-powered vehicle and the information on a tool required for installation of the target component. In the example in FIG. 7, the information on a component is being displayed.

Figure 8:
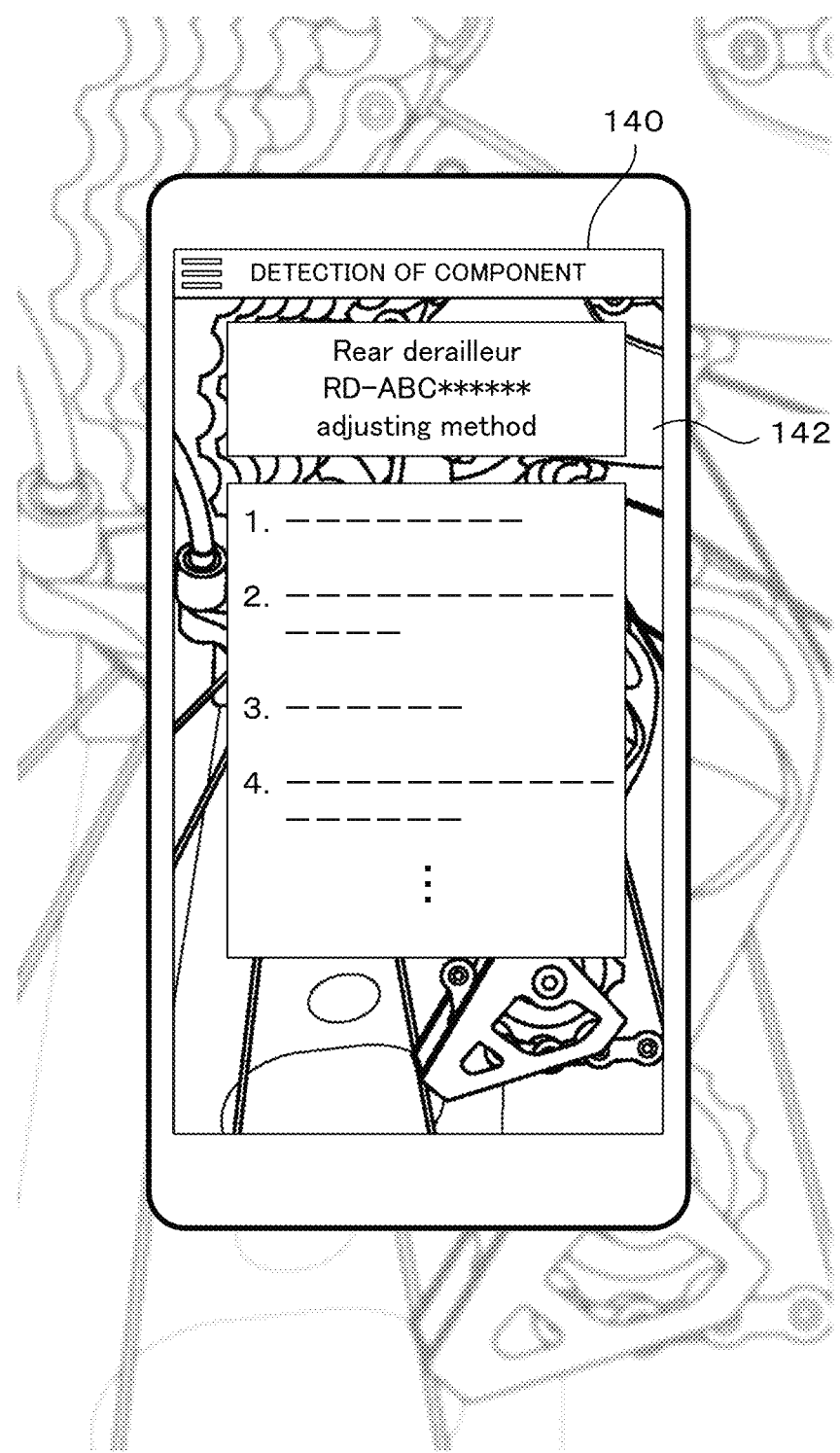
FIG. 8 illustrates a still another output example of the related information displayed on the display unit of the detecting device in Embodiment 1.

FIG. 8 illustrates a still another display example of the related information displayed on the display unit 104 of the detecting device 1. FIG. 8 is a display example displayed when the "adjusting method" is selected from the menu 146 illustrated in FIG. 6. If the "adjusting method" is selected, the detailed information indicating an adjusting procedure is displayed as illustrated in FIG. 8.

Figure 9:
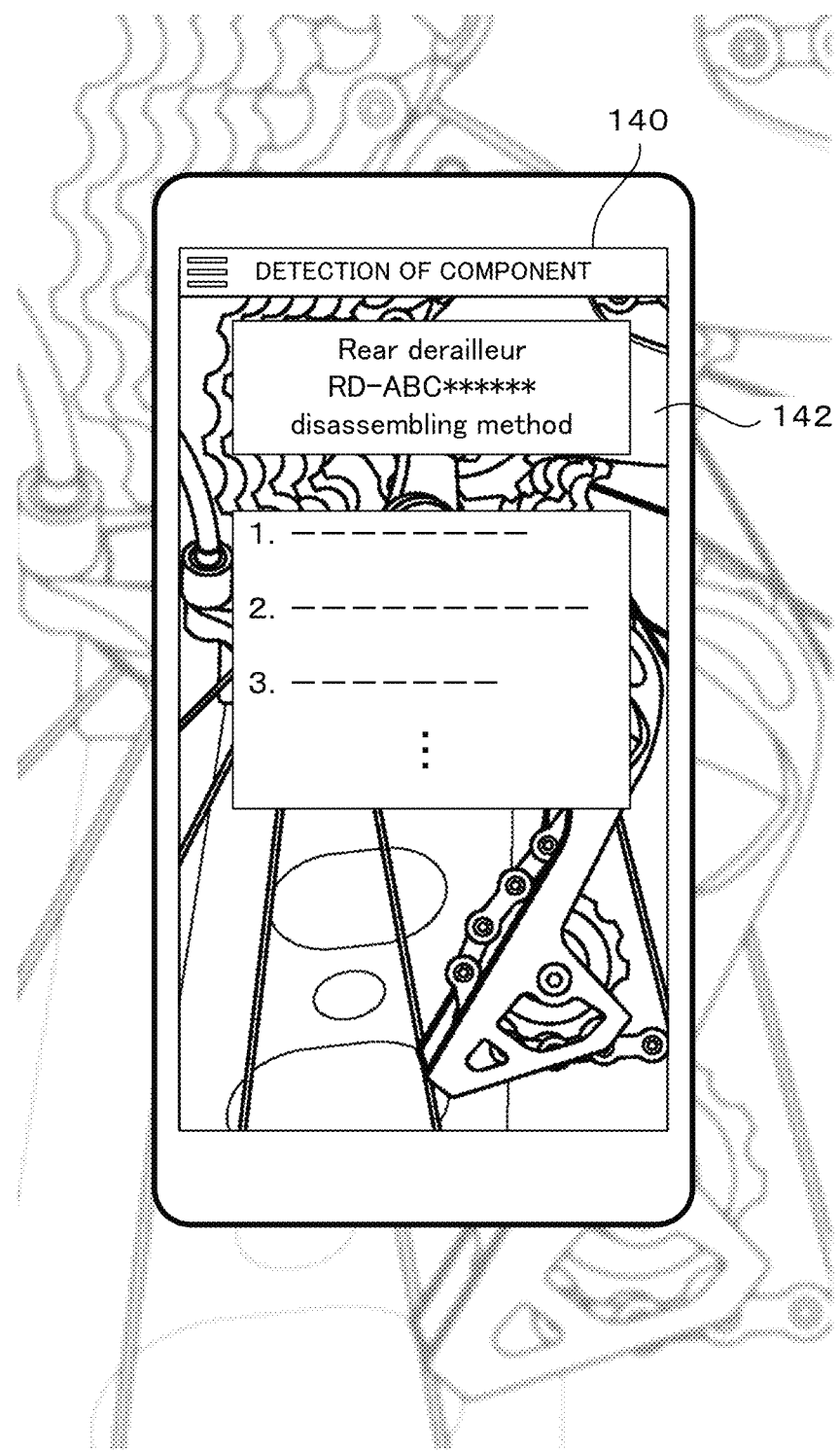
FIG. 9 illustrates a still another output example of the related information displayed on the display unit of the detecting device in Embodiment 1.

FIG. 9 illustrates a still another display example of the related information displayed on the display unit 104 of the detecting device 1. FIG. 9 is a display example displayed when the "disassembling method" is selected from the menu 146 illustrated in FIG. 6. If the "disassembling method" is selected, the detailed information indicating a disassembling procedure is displayed as illustrated in FIG. 9.

As illustrated from FIGS. 4 to 9, the user can activate the computer program 1P by using a smartphone or a tablet terminal, to thereby readily obtain the related information of the human-powered vehicle from the image of the human-powered vehicle. The detecting device 1 can detect the target object with accuracy by detection using the trained learning model 1M.

Embodiment 2

A learning model 1M in Embodiment 2 is also trained to output the position within a first image of an object related to the human-powered vehicle shown in the first image. The learning model 1M is trained as a single shot multibox detector (SSD). Since Embodiment 2 is similar in configuration to Embodiment 1 except for the details of the learning model 1M and the details of the processing performed by the control unit 100, common parts are denoted by similar reference codes and detailed description thereof will not be repeated.

Figure 10:
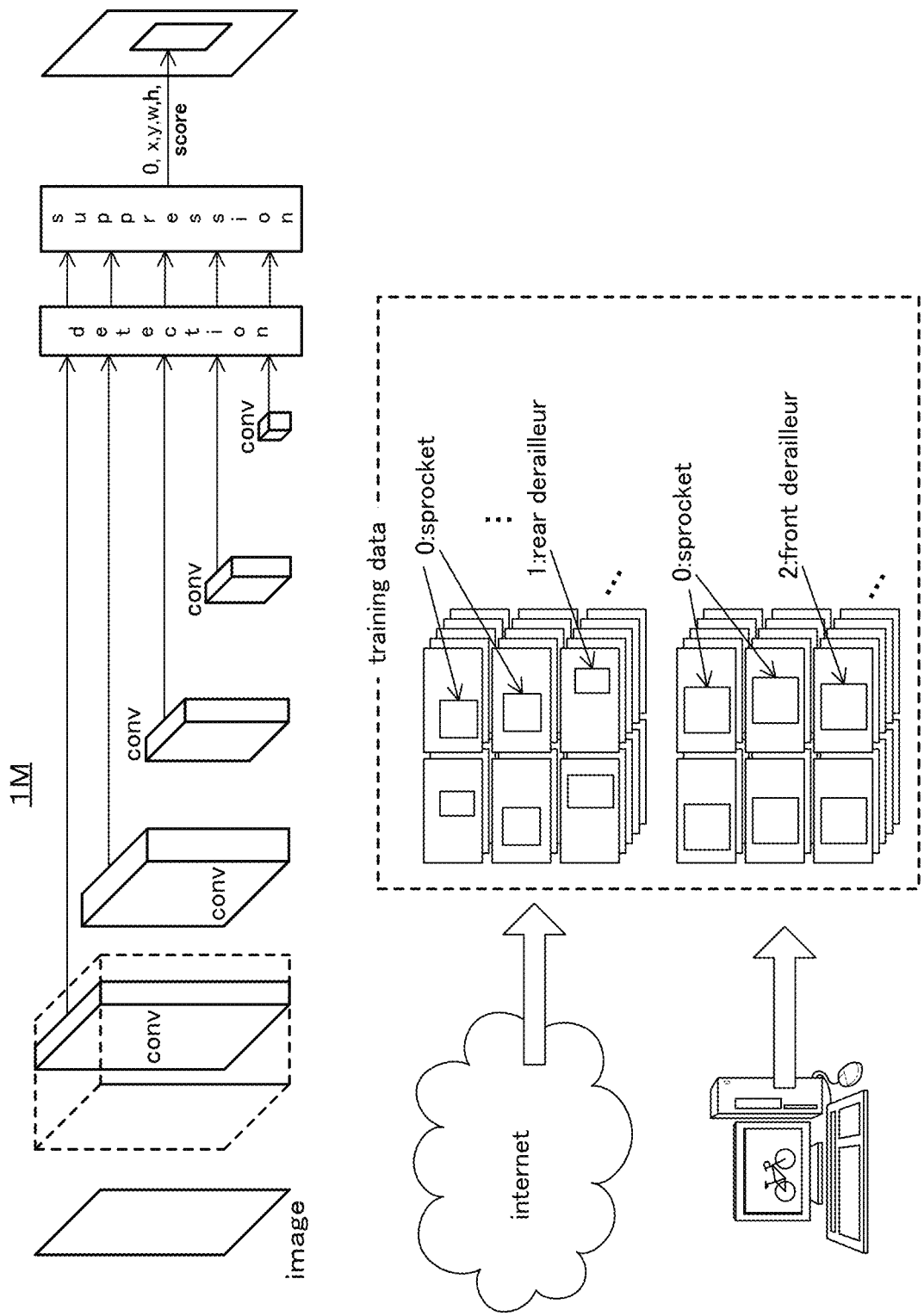
FIG. 10 illustrates the outline of a learning model in Embodiment 2.

FIG. 10 illustrates the outline of the learning model 1M in Embodiment 2. Here, the learning model 1M splits the inputted first image into multiple channels, and outputs feature maps of multiple scales in a stepwise manner after convolutional processing or pooling processing. The learning model 1M outputs the candidate and the degree of accuracy of the detection range for each feature map outputted every multiple step, collects the candidates for the detection range outputted for every multiple step while excluding the duplicated candidate, and outputs the detection frame and the degree of accuracy, i.e., score corresponding thereto.

The training data for generating the learning model 1M in Embodiment 2 also includes the position, width and height of the box indicating the range of the object in the first image. The learning model 1M that also outputs the position of an object may be a model in accordance with R-CNN, YOLO, or the like, though not limited to the model in accordance with SSD.

The training data for generating the learning model 1M that performs detection inclusive of the position illustrated in FIG. 10 as well is obtained similar to Embodiment 1 by labeling first images each including a part of the human-powered vehicle collected via the Internet with the identification information of the object shown in each of the first images, and by designating the position of the object in each of the first images in the model creating device managed by the business operator of the human-powered vehicle. It is noted that the learning model 1M may be generated by training data based on rendering images generated according to an application program for design related to at least one of the frame and a component of the human-powered vehicle by the model creating device managed by the business operator of the human-powered vehicle.

Figure 11:
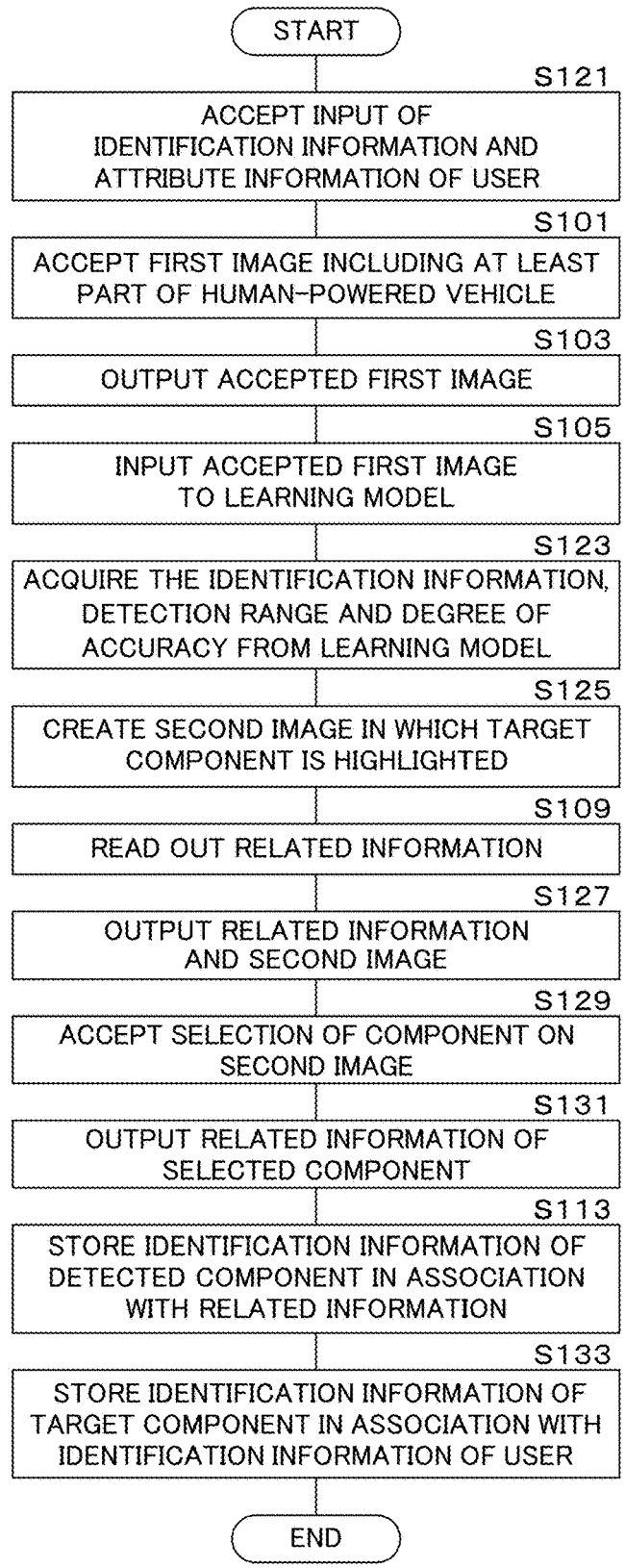
FIG. 11 is a flowchart showing one example of a detecting method for a component by the detecting device using the learning model in Embodiment 2.

FIG. 11 is a flowchart showing one example of a detecting method for a component by the detecting device 1 using the learning model 1M in Embodiment 2. In the processing procedure of the flowchart shown in FIG. 11, steps common to the processing procedure of the flowchart shown in FIG. 4 in Embodiment 1 are denoted by the same step numbers and the detailed description thereof will not be repeated.

In Embodiment 2, the control unit 100 accepts input of the identification information and attribute information of the user (step S121) and accepts a first image (S101). The acceptance of the identification information at step S121 may be performed only at the initial activation of the computer program 1P, or may be performed at every time the detecting processing is performed.

Alternatively, at step S121, the control unit 100 may accept operation input of selecting any one of the identification information of the multiple users stored in the storage device 102.

The learning model 1M in Embodiment 2 detects a component in accordance with the input of the first image at step S105, and outputs the identification information corresponding to the model number of the target component, the detection range of the component and the degree of accuracy. The control unit 100 acquires the identification information, the detection range and the degree of accuracy that are outputted from the learning model 1M (step S123).

The control unit 100 creates a second image in which the target component is highlighted based on the detected position within the first image, the width and the height that are included in the information on the acquired detection range (step S125). The second image is acquired by superimposing a box surrounding the component on the first image, for example. The second image is acquired by superimposing an outline on the component displayed on the first image, for example. The second image is an image of a speech balloon deriving from the component, for example. The second image is acquired by superimposing a translucent image over the range of the component displayed on the first image, for example. The second image may include a character string.

The control unit 100 reads out the related information of the component corresponding to the acquired identification information from the storage device 102 (S109). The control unit 100 outputs the read related information and the second image in which the detected component is highlighted (step S127). The control unit 100 causes the display unit 104 to display the related information and the second image.

The control unit 100 accepts selection of a component on the second image (step S129) and outputs the related information of the selected component (step S131).

The control unit 100 stores the identification information of the target object, i.e., the target component in the storage device 102 in association with the related information (S113). The control unit 100 stores the identification information of the target object, i.e., the target component in the storage device 102 in association with the identification information of the user of the human-powered vehicle (step S133) and ends the processing.

Figure 12:
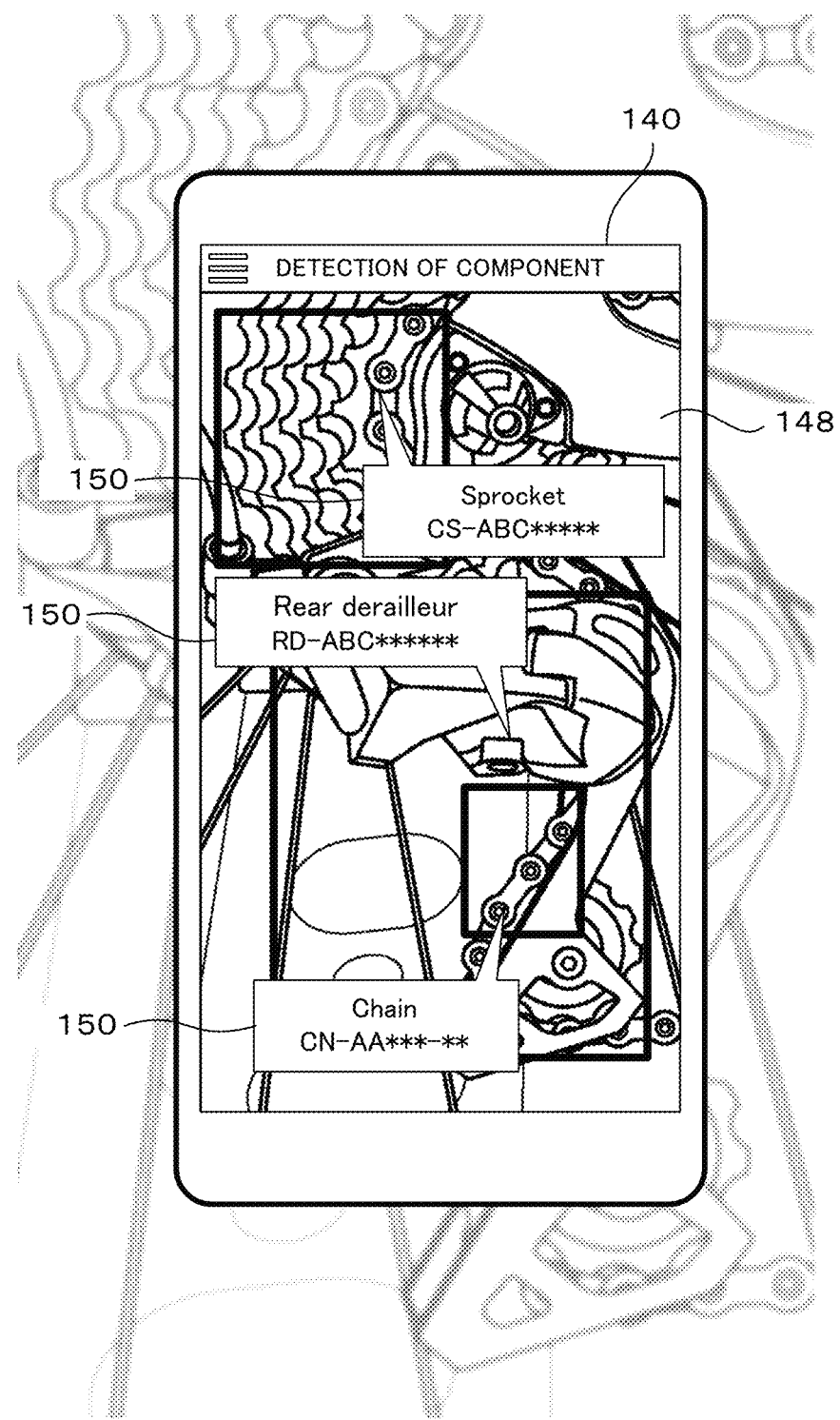
FIG. 12 illustrates an output example of related information displayed on the display unit of the detecting device in Embodiment 2.

FIG. 12 is a display example of the related information displayed on the display unit 104 of the detecting device 1 in Embodiment 2. FIG. 12 illustrates an example of an application screen 140 displayed on the display unit 104 in accordance with the computer program 1P. The application screen 140 includes a second image 148 in which detected components are highlighted. The second image 148 includes objects 150 corresponding to the detected components as components to be selected in a selectable manner. In the example in FIG. 12, detected three components are each surrounded by a detecting frame so as to be highlighted, and respective selectable objects 150 are represented by speech balloons.

Figure 13:
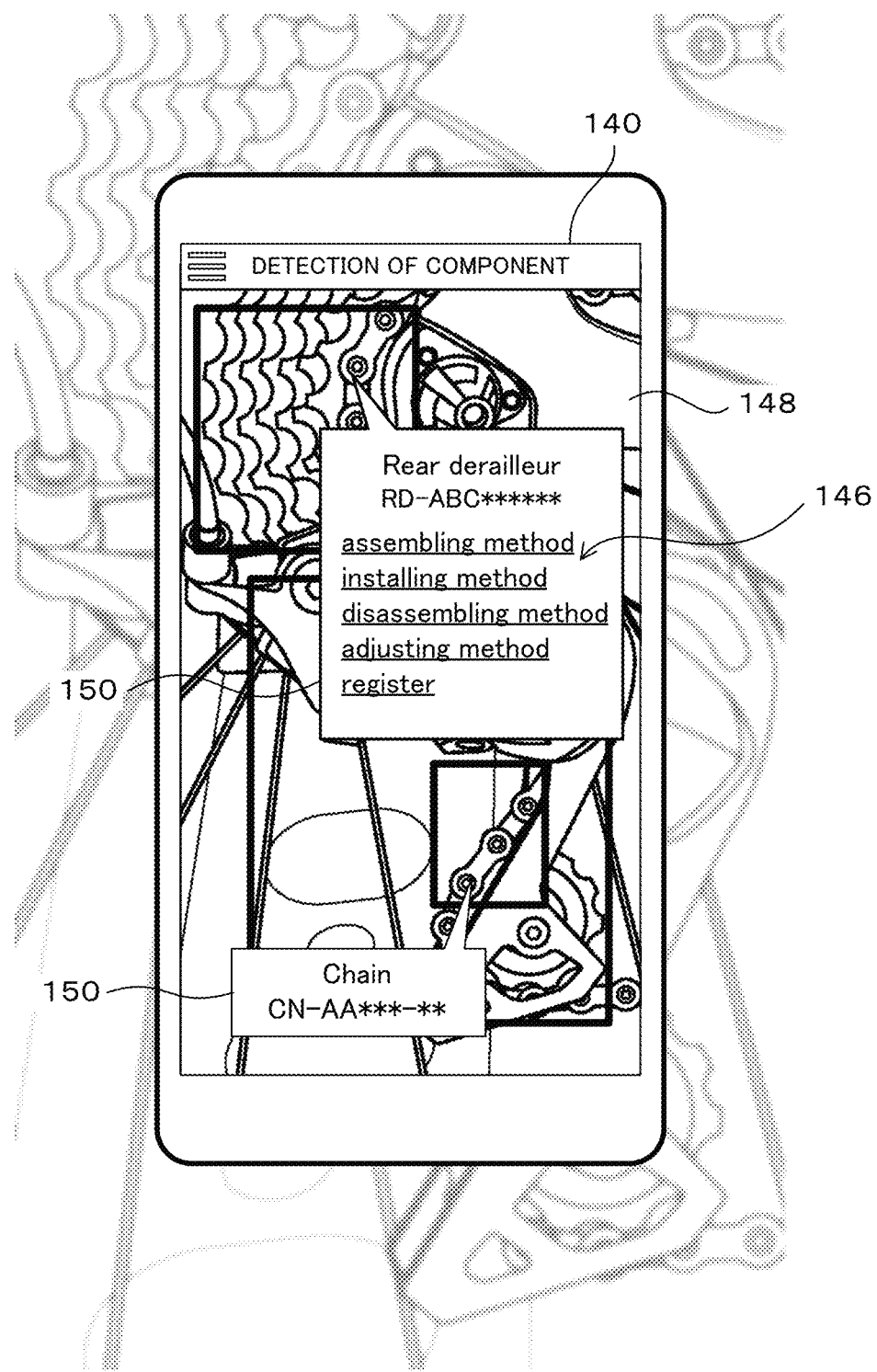
FIG. 13 illustrates another output example of the related information displayed on the display unit of the detecting device in Embodiment 2.

FIG. 13 illustrates another display example of the related information displayed on the display unit 104 of the detecting device 1. FIG. 13 is a display example displayed when the "rear derailleur" is selected from the objects 150 for the three components displayed in the example in FIG. 12. If the "rear derailleur" is selected, a menu 146 is displayed within the speech balloon object 150, which allows the user to select at least any one of the "assembling method," "installing method," "disassembling method," "adjusting method" and "register" as related information related to the detected "rear derailleur."

Figure 14:
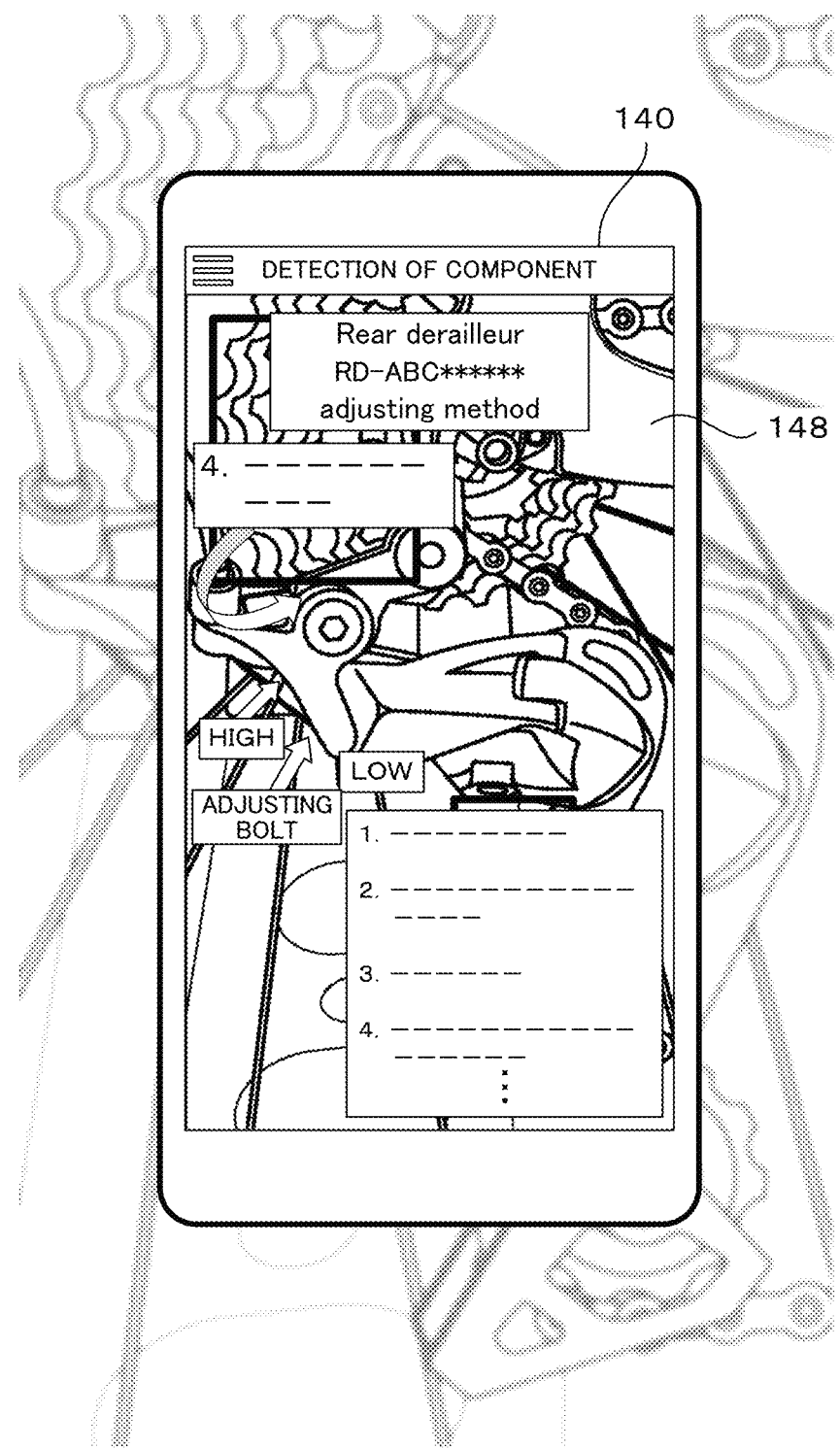
FIG. 14 illustrates still another output example of the related information displayed on the display unit of the detecting device in Embodiment 2.

FIG. 14 illustrates still another display example of the related information displayed on the display unit 104 of the detecting device 1. FIG. 14 is a display example when the "adjusting method" of the rear derailleur is selected from the menu 146 displayed in the example in FIG. 13. If the "adjusting method" is selected, the detailed information indicating an adjusting procedure is displayed as illustrated in FIG. 14. In Embodiment 2, position is also detected, which allows the user to specify the position of a bolt and the position where a chain is to be put on within the second image 148. Thus, the control unit 100 displays an image 152 representing a more detailed procedure on the second image 148.

The user can activate the computer program 1P by using a smartphone or a tablet terminal to readily obtain the related information of the human-powered vehicle from the image of the human-powered vehicle. The detecting device 1 in Embodiment 2 displays the second image in which components are highlighted, which allows the user to readily recognize the detected components and the related information.

Modification

In a modification embodiment, the detecting device 1 stores in advance in the storage device 102 an image of an installed state of a matching component for each model number of a component. The control unit 100 of the detecting device 1 in the modification embodiment stores in advance in the storage device 102 information on a matching state whether components match with each other as components to be mounted on the same human-powered vehicle in association with the model numbers of the respective components.

Figure 15:
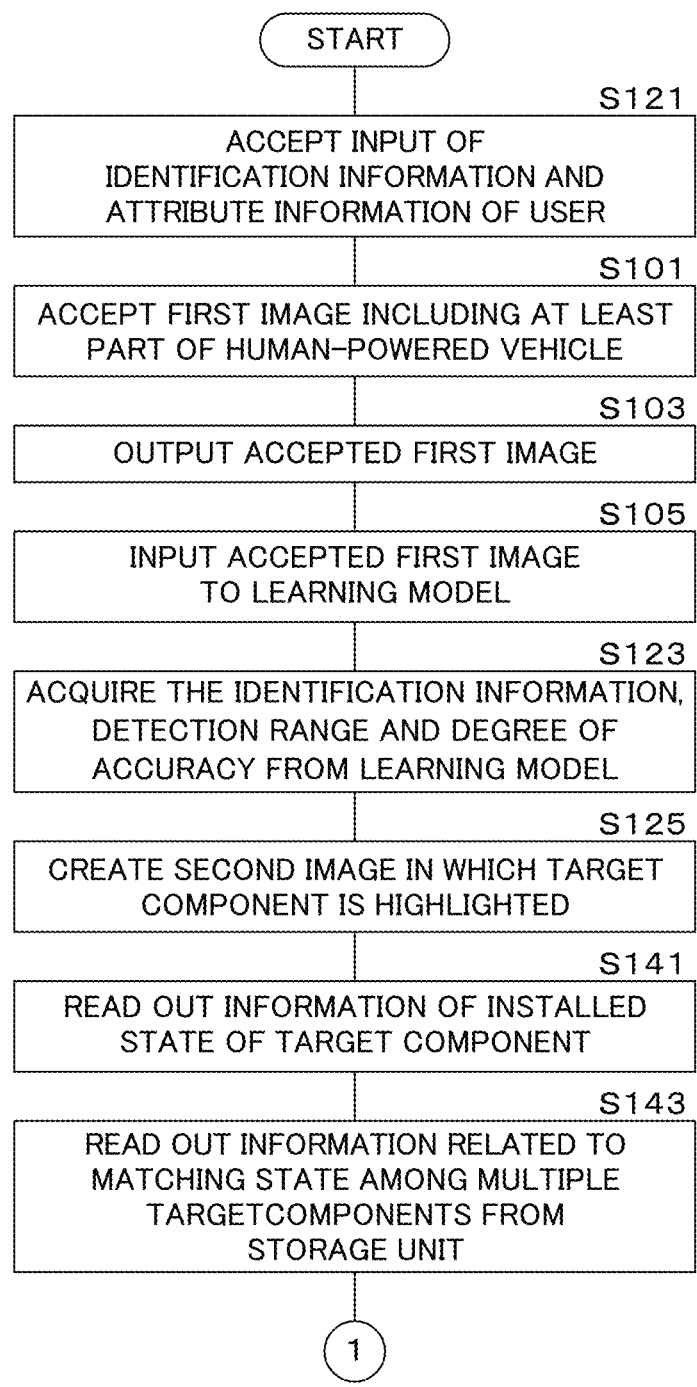
FIG. 15 is a flowchart showing one example of a processing procedure performed by the detecting device in a modification in Embodiment 2.
Figure 16:
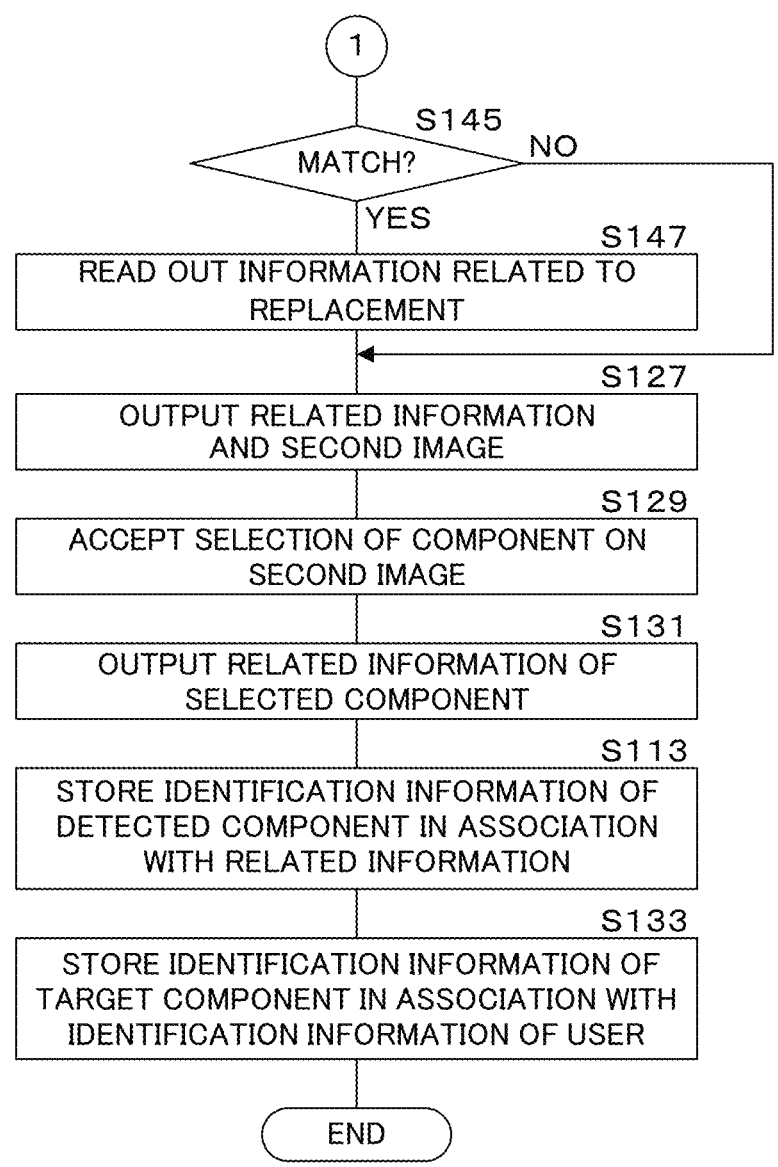
FIG. 16 is a continuation of the flowchart of FIG. 15 showing one example of the processing procedure performed by the detecting device in the modification in Embodiment 2.

FIG. 15 and FIG. 16 are flowcharts illustrating one example of the processing procedure performed by the detecting device 1 in the modification. In the processing procedure of the flowcharts illustrated in FIGS. 15 and 16, steps common to those in the processing procedure of the flowchart shown in FIG. 11 in Embodiment 2 are denoted by the same step numbers and the detailed description thereof will not be repeated.

The control unit 100 acquires the identification information, the detection range, and the degree of accuracy of the target component at step S123 (S123). At step S123, the control unit 100 may acquire multiple identification information from the learning model 1M. That is, the control unit 100 may detect multiple target components from the first image by the processing at steps S105 and S123.

The control unit 100 reads out an image of an installed state stored in the storage device 102 as related information in association with the model numbers corresponding to the identification information acquired at step S123 (step S141). The processing at step S141 may be implemented after step S123 and before or after the creation of the second image at step S125.

The control unit 100 reads out a matching state among the multiple components mounted on the human-powered vehicle as related information from the storage device 102 by using the identification information of the target components acquired at step S123 and the identification information of the components in association with the identification information of the user accepted at S121 (step S143). If the control unit 100 detects multiple components from the first image at steps S125 and S105, the identification information of the component associated with the identification information of the user that has already been acquired may not be used.

The processing procedure is continued from step S143 in FIG. 15 to step S145 in FIG. 16, as indicated by the circled numeral 1 in FIGS. 15 and 16. The control unit 100 determines whether or not the multiple components do not match with each other in accordance with the matching state read out at step S143 (step S145). If it is determined that these components do not match with each other (S145: YES), the control unit 100 reads out information on a replacement for the detected component as related information from the storage device 102 (step S147).

The control unit 100 outputs information on the installed state that is read out at step S141 regarding the target component (step S127). If detecting multiple target components from the first image at step S123, the control unit 100 may output information on the matching state among the multiple target components as related information. At step S127, the control unit 100 may include information on a replacement for the target component. The information on a replacement includes information on another component that is required when the target component is replaced with such a replacement.

The related information outputted at step S127 may include a diagnostic result of the quality of the installed state. Here, the control unit 100 diagnoses the quality of the installed state of a component from the first image obtained by imaging the component.

For example, the control unit 100 inputs a first image, diagnoses the quality of the installed state by using a trained diagnostic model trained to output the quality of the installed state, and outputs a diagnostic result as one of the information on the installed state.

Hence, the user can readily obtain the information on the installed state of a component and the information on a matching among multiple components from the image of the human-powered vehicle.

Embodiment 3

In Embodiment 3, the target object includes a frame of the human-powered vehicle. The control unit 100 detects the frame as a target frame from a first image.

In Embodiment 3, a learning model 1M is trained as SSD so as to also output the position, within the first image, of an object related to the human-powered vehicle shown in the first image similarly to Embodiment 2. Since Embodiment 3 is similar in configuration to Embodiment 1 or Embodiment 2 except for the details of the learning model 1M and the details of the processing performed by the control unit 100, common parts are denoted by similar reference codes and detailed description thereof will not be repeated.

Figure 17:
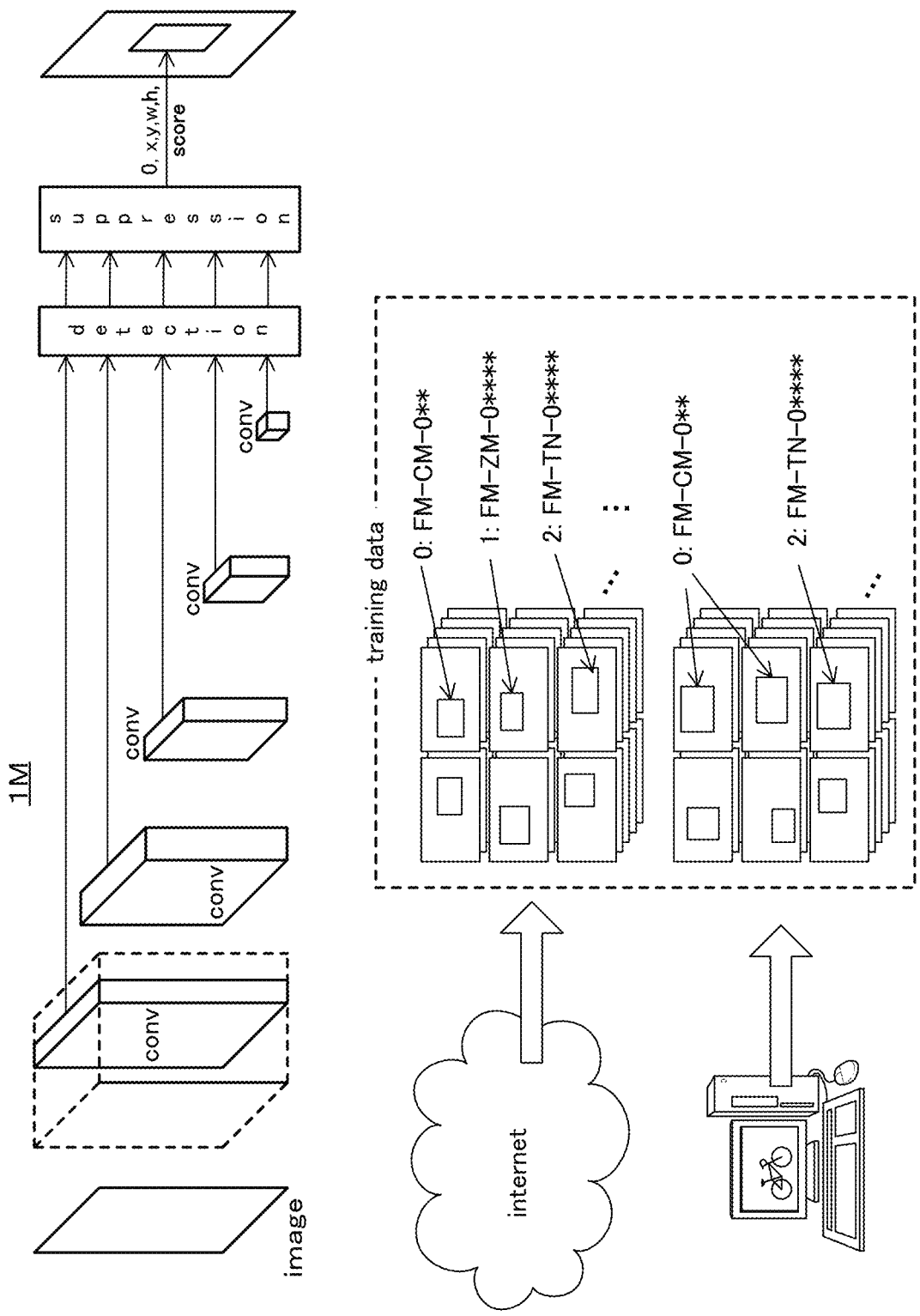
FIG. 17 illustrates the outline of a learning model in Embodiment 3.

FIG. 17 illustrates the outline of the learning model 1M in Embodiment 3. In Embodiment 3, the learning model 1M is generated by using training data obtained by labeling first images each including a part of the human-powered vehicle collected via the Internet with the identification information of the object shown in each of the first images by the model creating device managed by the business operator of the human-powered vehicle. In Embodiment 3, the learning model 1M is generated using the training data labeled with the identification information that is associated with the type and model number of the frame. The learning model 1M may be generated by training data based on rendering images generated according to an application program for design related to the frame of the human-powered vehicle by the model creating device managed by the business operator of the human-powered vehicle.

The detecting processing using the learning model 1M illustrated in FIG. 17 will be described with reference to a flowchart.

In Embodiment 3, the target object includes the frame of the human-powered vehicle as described above. The control unit 100 detects the frame of the human-powered vehicle as a target frame, accepts the physical information of the user who is a rider, and outputs information on the recommended parts such as a chain, a component or the like as related information.

Figure 18:
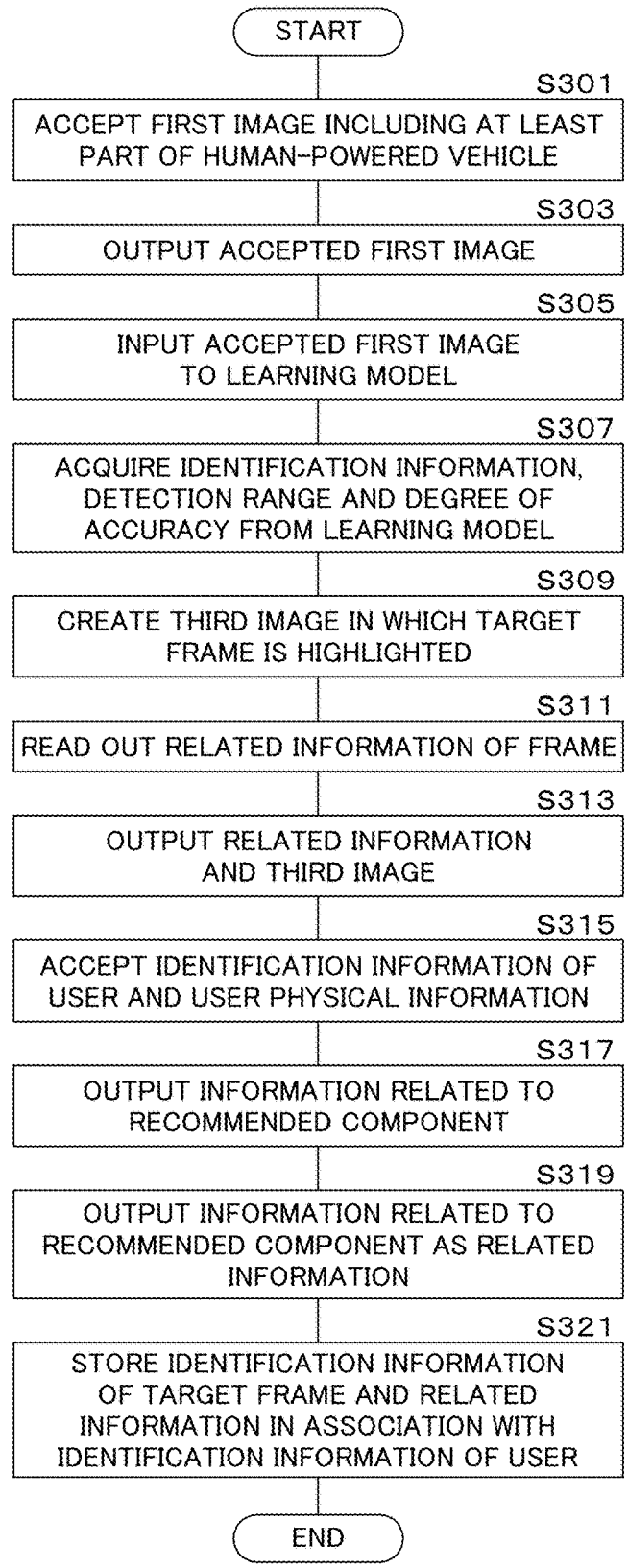
FIG. 18 is a flowchart showing one example of a processing procedure performed by the detecting device in Embodiment 3.

FIG. 18 is a flowchart showing one example of a processing procedure performed by the detecting device 1 in Embodiment 3. When the user carrying the detecting device 1, which is a smartphone, or a maintenance staff for the human-powered vehicle carrying the detecting device 1 activates a computer program 1P in Embodiment 3, the control unit 100 executes the following processing.

The control unit 100 accepts a first image including the human-powered vehicle (step S301). At step S301, the control unit 100 activates the imaging unit 112 to accept image output. Alternatively, having stored first images acquired by the imaging unit 112 in the storage device 102, the control unit 100 may read out a selected one of the first images from the storage device 102 thereby accept the first image at step S301.

The control unit 100 outputs the accepted first image (step S303). At step S303, the control unit 100 causes the display unit 104 to display the first image.

The control unit 100 inputs the accepted first image to the trained learning model 1M (step S305). The learning model 1M outputs the identification information corresponding to the type or model number of the detected frame, the detection range of the frame and the degree of accuracy in accordance with the input of the first image. The control unit 100 acquires the identification information, the detection range and the degree of accuracy that are output from the learning model 1M (step S307). At step S307, the dimensions may also be detected. At steps S305 and S307, the control unit 100 detects the frame of the human-powered vehicle as a target frame from the first image.

The control unit 100 creates a third image in which the target frame is highlighted in accordance with the detected position, width and height of the frame within the first image included in the information of the detection range acquired at step S307 (step S309). The third image is acquired by superimposing a line tracing the frame on the first image, for example. The third image is acquired by superimposing a box surrounding the frame on the first image, for example. The third image is an image of a speech balloon deriving from the frame, for example. The third image is acquired by superimposing a translucent image over the range of the frame displayed on the first image, for example. The third image may include a character string.

The control unit 100 reads out the related information of the frame corresponding to the identification information acquired at step S307 from the storage device 102 (step S311), and outputs the read related information and a third image in which the target frame is highlighted (step S313). The control unit 100 causes the display unit 104 to display the related information and the third image.

The control unit 100 accepts identification information of the user and user information (step S315). The control unit 100 may accept the identification information of the user and the user information via the operating unit 106 of the display unit 104, or may read out the identification information of the user and the user information that are stored in advance in the storage device 102.

If the physical information includes the position of a joint of the user, the acceptance of the position is performed as described below. The user or the third person photographs an image of the user riding the human-powered vehicle of interest. The photographed image is acquired by the detecting device 1.

Photographing itself may be performed by the imaging unit 112 of the detecting device 1. The control unit 100 of the detecting device 1 accepts selection of the position of a joint on a touch panel with the photographed image displayed on the display unit 104 according to the computer program 1P. The control unit 100 may automatically detect the position of a joint of the user by using any detection engine separately provided for detecting the position of a joint.

The control unit 100 outputs information related to a recommended component in accordance with at least one of the physical information and attribute information of the user accepted at step S315 and the target frame that is detected at step S307 (step S317). The storage device 102 has stored the model number of a recommended component in association with the information on the model number of the frame and the height or the position of a joint of the user. The control unit 100 outputs the information related to the recommended component in accordance with the information stored in the storage device 102.

The control unit 100 outputs the information related to the recommended component as related information (step S319).

At step S319, the control unit 100 causes the display unit 104 to display the related information. The control unit 100 stores in the storage device 102 the identification information of the target frame and the related information in association with the identification information of the user (step S321), and ends the processing.

Figure 19:
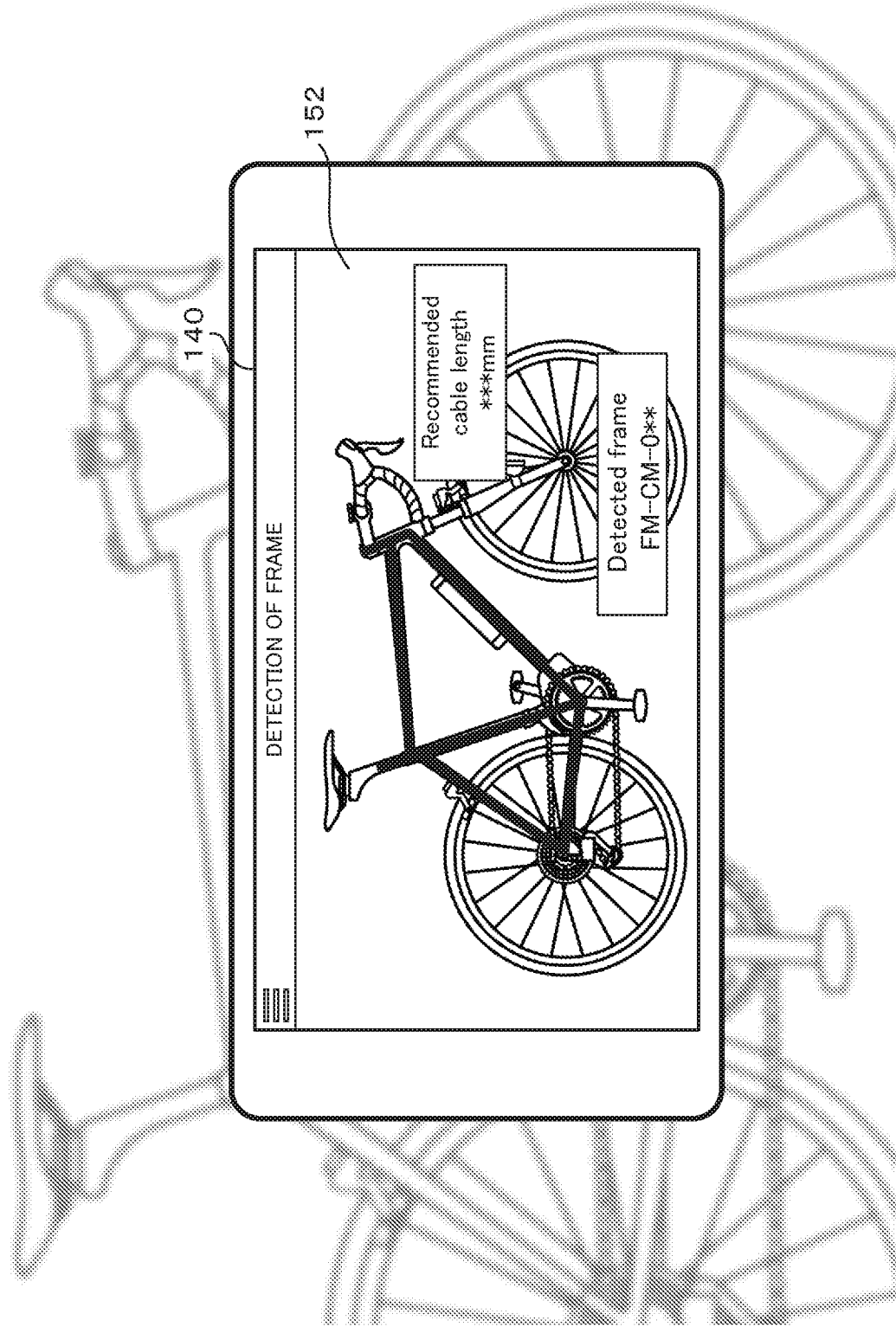
FIG. 19 illustrates an output example of related information displayed on the display unit of the detecting device in Embodiment 3.

The control unit 100 outputs the related information as at least one of text data and graphical data, such as a character string or an image. FIG. 19 is a display example of the related information displayed on the display unit 104 of the detecting device 1. FIG. 19 displays an example of an application screen 140 in accordance with the computer program 1P that is being displayed on the display unit 104. The application screen 140 includes the third image 154 outputted to the display unit 104 at step S313. On the application screen 140, the related information related to the target frame shown in the third image 154 is outputted as a text data so as to be superimposed on the third image 154. In the example in FIG. 19, the related information including the model number of the target frame, and the details of the recommended component is displayed as text data and a rectangular box.

Hence, the user can readily obtain the related information related to the frame provided in the human-powered vehicle from the image of the human-powered vehicle by such a detecting device 1. The user inputs the physical information to thereby readily acquire the information on the frame and components that are fit for the body of the user himself.

Embodiment 4

The detecting device 1 in Embodiment 4, if the degree of accuracy through the detection by the learning model 1M is equal to or less than a predetermined value, accepts selection of the identification information of the shown component or frame, and retrains the learning model 1M by fourth images labeled with the selected identification information. Since Embodiment 4 is similar in configuration to Embodiment 1 except for the details of the processing performed by the control unit 100, common parts are denoted by similar reference codes and detailed description thereof will not be repeated.

Figure 20:
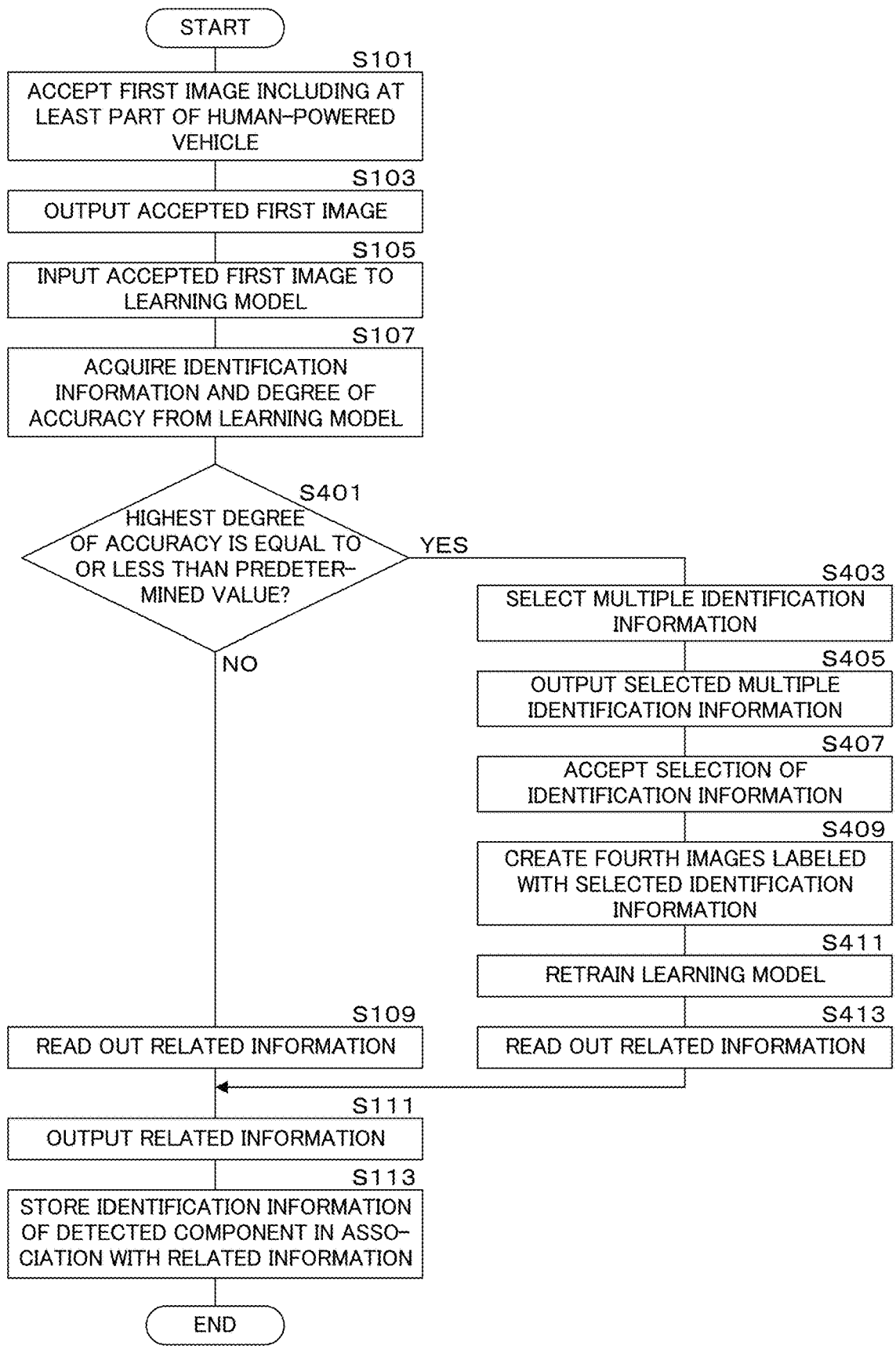
FIG. 20 is a flowchart showing one example of a processing procedure performed by the detecting device in Embodiment 4.

FIG. 20 is a flowchart showing one example of a processing procedure performed by the detecting device 1 in Embodiment 4. In the processing procedure of the flowchart shown in FIG. 20, steps common to the processing procedure of the flowchart shown in FIG. 3 in Embodiment 1 are denoted by the same step numbers and the detailed description thereof will not be repeated.

If the control unit 100 inputs an accepted first image to the trained learning model 1M at step S105, multiple identification information and the degree of accuracy corresponding thereto are outputted from the learning model 1M. In Embodiment 1, the control unit 100 may acquire the identification information with the highest degree of accuracy at step S107. In Embodiment 3, if the highest degree of accuracy is equal to or less than a predetermined value, the learning model 1M is retrained. If the degree of accuracy that is outputted from the learning model 1M is equal to or less than a predetermined value, the control unit 100 outputs multiple identification information of objects in descending order of the degree of accuracy, that is, from the highest degree of accuracy, and trains the learning model 1M with the fourth images labeled with the selected identification information of the object.

The control unit 100 determines whether the degree of accuracy is equal to or less than the predetermined value or not for the identification information and the degree of accuracy that are outputted from the learning model 1M at step S107 (step S401).

If it is determined that the degree of accuracy is not equal to or less than the predetermined value (S401: NO), the control unit 100 advances the processing to step S109.

If it is determined that the degree of accuracy is equal to or less than the predetermined value (S401: YES), the control unit 100 selects a predetermined number of identification information in descending order of the degree of accuracy among the multiple identification information that are outputted from the learning model 1M (step S403) and outputs the selected multiple identification information (step S405). At step S405, the control unit 100 causes the display unit 104 to display the multiple identification information. The multiple identification information candidates that are output at step S405 allow the user to find and select what the component is, such as the name, the model number, or the like, of the component that is associated with the identification information that is outputted from the learning model 1M.

The control unit 100 accepts selection of any one of the multiple identification information candidates that are outputted at step S405 (step S407) and creates fourth images labeled with the selected identification information candidate of the object (step S409). The control unit 100 retrains the learning model 1M using the created fourth images as training data (step S411), reads out the related information corresponding to the selected identification information (step S413) and advances the processing to step S111.

Hence, if the degree of accuracy that is outputted by the learning model from the image is equal to or less than the predetermined value, selection from candidates is accepted to thereby retrain the learning model, which enhances the accuracy of the detection.

Embodiment 5

Figure 21:
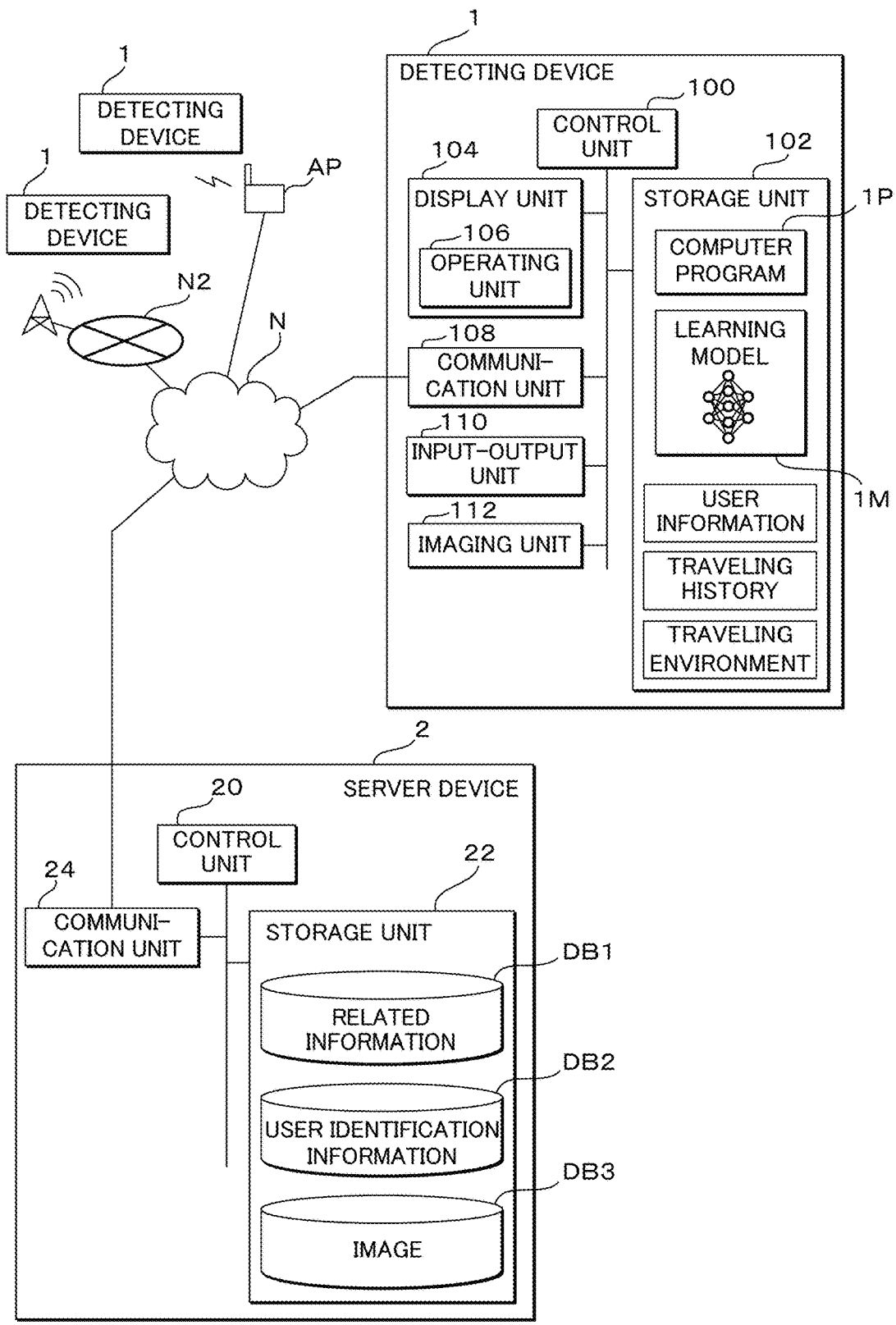
FIG. 21 is a block diagram illustrating the configuration of a system including the detecting device and a server device in Embodiment 5.

In Embodiment 5, related information is stored in a server device 2 that can be connected to communicate with a detecting device 1. The detecting device 1 thus acquires the related information from the server device 2. FIG. 21 is a block diagram illustrating the configuration of a system including the detecting device 1 and the server device 2 in Embodiment 5. Since a part of the configuration of the detecting device 1 in Embodiment 5 is similar to that of Embodiment 1, common parts of the configuration are denoted by similar reference codes and detailed description thereof will not be repeated.

The detecting device 1 in Embodiment 5 includes a control unit 100, a storage device 102, a display unit 104, a communication unit 108, an input-output unit 110 and an imaging unit 112.

In the storage device 102 of the detecting device 1 of Embodiment 5, no related information is stored. The related information stored in the server device 2 is used. The storage device 102 stores a traveling history of the human-powered vehicle of the user of the detecting device 1, which is a smartphone. The storage device 102 also stores traveling environment information indicating traveling environment of the human-powered vehicle. The traveling environment includes information on the type of a road surface for traveling specified by position information and information on the weather. In the first example, the traveling history and the traveling environment are information acquired from a cycle computer of the human-powered vehicle through the input-output unit 110 or another wireless communication module. Alternatively, the traveling history and the traveling environment may be acquired by the control unit 100 of the detecting device 1 performing a measurement in accordance with another computer program.

The communication unit 108 of the detecting device 1 in Embodiment 5 may be connected to a public communication network N via an access point AP using a wireless communication device complying with Wi-Fi. The communication unit 108 may be a carrier communication module for achieving communication via a carrier network N2.

A server computer is used for the server device 2. The server device 2 includes a control unit 20, a storage device 22 and a communication unit 24. The server device 2 will be described using one server computer, though multiple server computers may be used to share the function or processing.

The control unit 20 is a processor using a CPU or a GPU. The control unit 20 executes processing using a memory such as a built-in ROM, RAM, or the like.

The storage device 22 includes a non-volatile memory, for example, a hard disk, a solid state drive (SSD), or the like. The storage device 22 stores a server program 2P. The control unit 20 reads out and executes the server program 2P.

The storage device 22 includes a related information database DB1, a user identification information database DB2 and an image database DB3. The related information database DB1 includes information related to a target component or a target frame.

More specifically, the related information database DB1 includes information on the type, model number, specification, assembling method, installing method, disassembling method and adjusting method for a component, a replacement for the component, a matching between components, and a matching between a frame and the component. The related information database DB1 may include information on the matching collected from staffs or maintenance staffs of the dealers of a human-powered vehicle, of a component and of a frame as well as information provided from component makers and frame makers. The user identification information database DB2 includes information on the name, nickname, user ID and e-mail address of the user of the human-powered vehicle. The image database DB3 includes information related to an image including the human-powered vehicle.

The communication unit 24 is a communication module that can be connected to communicate with a public communication network N. The communication unit 24 is a network card for wired connection. The control unit 20 transmits and receives information with the detecting device 1 by the communication unit 24.

Figure 22:
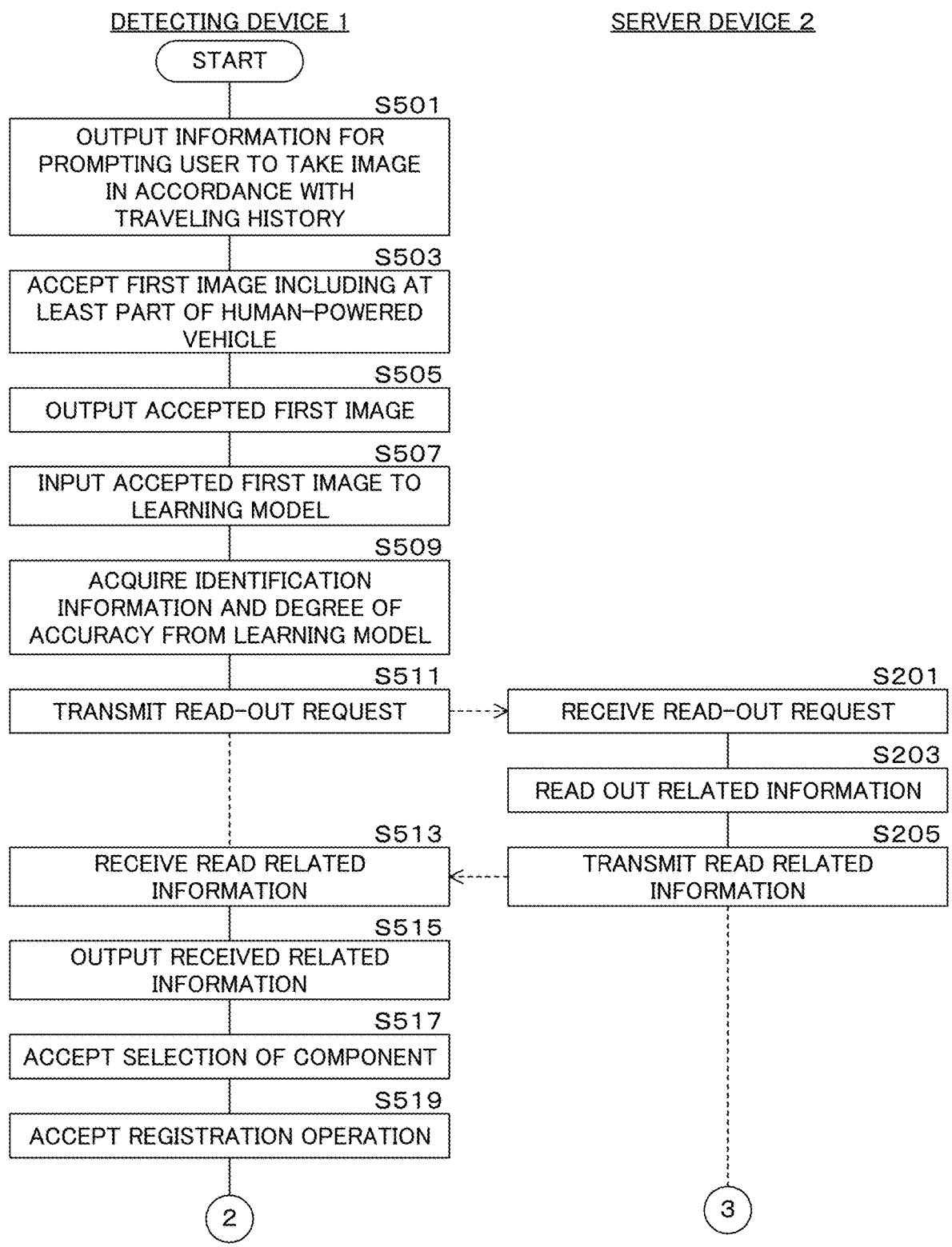
FIG. 22 is a flowchart showing one example of a processing procedure in Embodiment 5.
Figure 23:
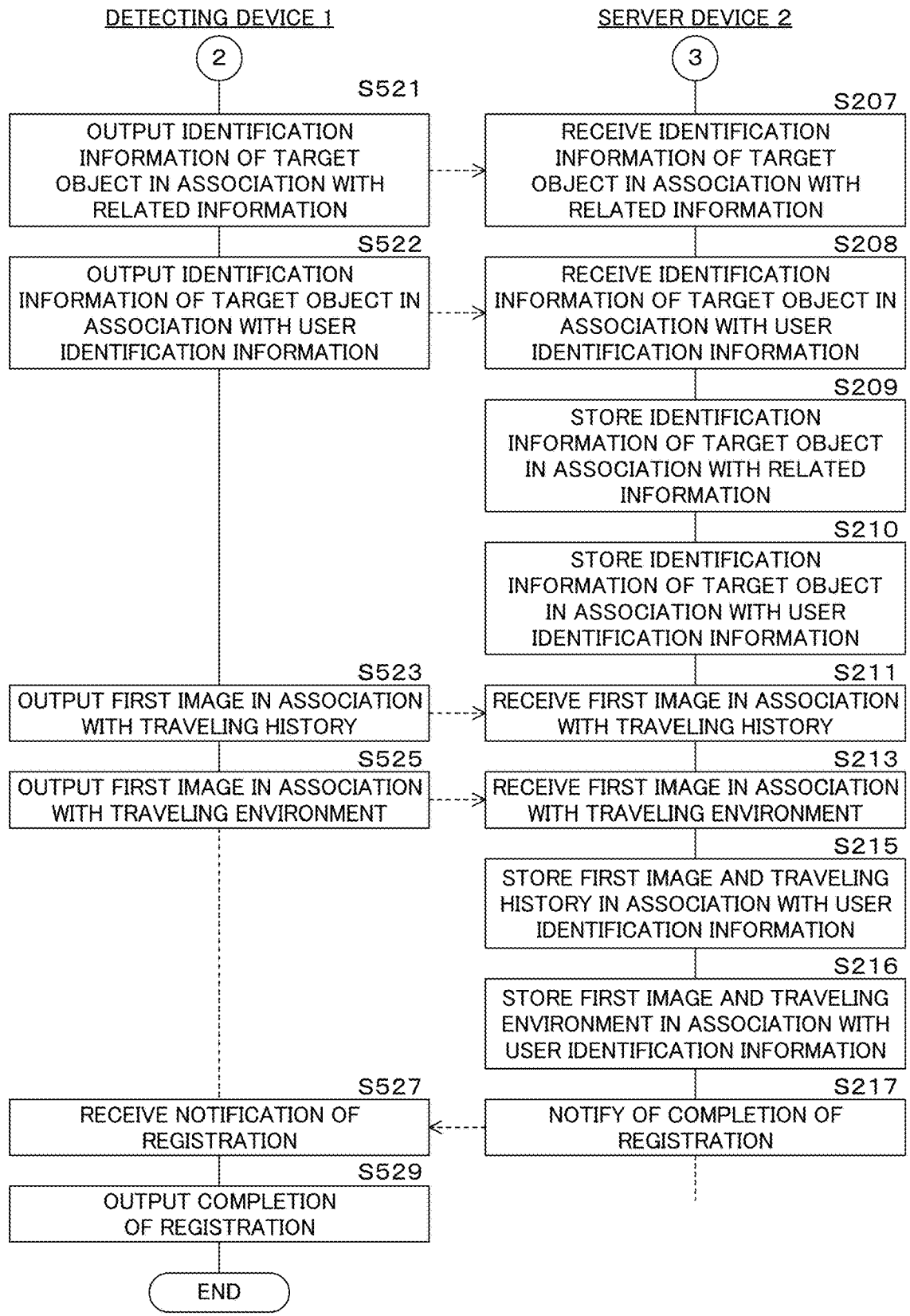
FIG. 23 is a continuation of the flowchart of FIG. 22 showing one example of the processing procedure in Embodiment 5.

FIG. 22 and FIG. 23 are flowcharts showing one example of the processing procedure in Embodiment 5. When the user carrying the detecting device 1, which is a smartphone, or a maintenance staff for the human-powered vehicle carrying the detecting device 1 activates a computer program 1P, the control unit 100 executes the following processing.

The control unit 100 outputs information for prompting the user to input a first image to the display unit 104 in accordance with the traveling history of the human-powered vehicle stored in the storage device 102 (step S501). The output destination at step S501 is not limited to the display unit 104, and may be a voice input-output unit provided in the detecting device 1 used for performing voice output.

The control unit 100 accepts a first image including the human-powered vehicle (step S503). At step S503, the control unit 100 activates the imaging unit 112 to accept image output. Alternatively, having stored first images acquired by the imaging unit 112 in advance in the storage device 102, the control unit 100 may read out a selected one of the first images from the storage device 102 to thereby accept the first image at step S101.

The control unit 100 outputs the accepted first image (step S505). At step S505, the control unit 100 causes the display unit 104 to display the first image.

The control unit 100 inputs the accepted first image to the trained learning model 1M (step S507). The learning model 1M detects a component in accordance with the input of the first image, and outputs the identification information corresponding to the model number of the target component and the degree of accuracy. The control unit 100 acquires the identification information and the degree of accuracy that are outputted from the learning model 1M (step S509). By steps S507 and S509, the control unit 100 detects the component of the human-powered vehicle as a target component from the first image. The control unit 100 transmits a read-out request for the related information that includes the acquired identification information from the communication unit 108 to the server device 2 (step S511).

The server device 2 receives the read-out request for the related information by the communication unit 24 (step S201), and the communication unit 20 reads out the related information of the component corresponding to the identification information of the component included in the read-out request from the storage device 22 (step S203). At step S203, the control unit 20 may read out various information including the related information obtained from the maintenance staff from the specification information of the component stored in the storage device 22. The control unit 20 transmits the read related information to the detecting device 1 (S205).

The detecting device 1 receives the related information transmitted from the server device 2 (step S513), and the control unit 100 outputs the related information of the component corresponding to the identification information detected at step S509 to the display unit 104 (step S515).

The control unit 100 accepts selection of any one of the components that are being outputted (step S517), and accepts registration operation through a menu 146 regarding the selected one of the components (step S519).

For detecting device 1, the processing procedure is continued from step S519 in FIG. 22 to step S521 in FIG. 23, as indicated by the circled numeral 2 in FIGS. 22 and 23. The control unit 100 outputs the identification information of the selected component, i.e., the target object to the external device (server device 2) in association with the related information of the user via the communication unit 108 (step S521).

The control unit 100 outputs, regarding the selected component, the first image accepted at step S503 to the external device (server device 2) in association with the traveling history of the human-powered vehicle stored in the storage device 102 (Step S523).

The control unit 100 outputs, regarding the selected component, the first image accepted at step S503 to the external device (server device 2) in association with the traveling environment of the human-powered vehicle stored in the storage device 102 (Step S525).

The processing procedures at steps S523 and S525 are not necessarily performed, and any one of the processing procedures may be performed.

For server device 2, the processing procedure is continued from step S205 in FIG. 22 to step S207 in FIG. 23, as indicated by the circled numeral 3 in FIGS. 22 and 23. The server device 2 receives the identification information of the target object (target component) in association with the related information (step S207), and receives the identification information of the target object (target component) in association with the identification information of the user (step S208). The control unit 20 stores the identification information of the target object (target component) in association with the related information in the related information database DB1 of the storage device 22 (step S209), and stores the identification information of the target object (target component) in association with the identification information of the user in the user identification information database DB2 of the storage device 22 (step S210).

The control unit 20 receives the first image in association with the traveling history (step S211), and receives the first image in association with the traveling environment (step S213). The control unit 20 stores the first image associated with the traveling history in association with the identification information of the user received at step S208 in the image database DB3 of the storage device 22 (step S215), and stores the first image associated with the traveling environment in association with the identification information of the user received at step S208 in the image database DB3 of the storage device 22 (step S216). The control unit 20 notifies the detecting device 1 of completion of the registration (step S217) and ends the processing.

When receiving the notification of registration (step S527), the detecting device 1 outputs the completion of registration to the display unit 104 (step S529) and ends the processing.

At step S215, the first image is stored in the server device 2 in association with the traveling history, that is, the information on how far the human-powered vehicle travels. The information stored at step S215 may be used for notifying the user how much the component is worn. The information stored at step S215, that is, the first image of the worn or dirty component may be used as training data for retraining the learning model 1M aside from the first image of a new component.

At step S216, the first image is stored in the server device 2 in association with the traveling environment, that is, the information on what environment the human-powered vehicle travels. The information stored at step S216 may be used for retraining the learning model 1M by using the first image of the component as training data for each training environment.

Embodiment 5 describes the detection of a component though similar processing may also be performed for the detection of a frame.

Embodiment 5 is configured to allow the server device 2 to store the related information, and thus the related information is read out from the server device 2. The server device 2 may store the learning model 1M as well. The detecting device 1 may acquire the information on the identification information that is output from the learning model 1M and use the information for the detecting processing. Here, the server device 2 updates the learning model 1M by the first images collected from multiple detecting devices 1, which shows promise for more accurate detection.

DESCRIPTION OF REFERENCE CHARACTERS

1 . . . detecting device
100 . . . control unit
102 . . . storage device
104 . . . display unit
106 . . . operating unit
108 . . . communication unit
110 . . . input-output unit
112 . . . imaging unit
114 . . . training computer
1P . . . computer program
1M . . . learning model
2 . . . server device
20 . . . control unit
22 . . . storage device
24 . . . communication unit
2M . . . learning model
5 . . . storage medium
5P . . . computer program
5M . . . machine learning model

The invention claimed is:

1. A detecting device for a user of a human-powered vehicle, comprising:
 a control unit including processing circuitry, the control unit being configured to detect, in a first image including at least a part of the human-powered vehicle, a first component that is classified as a first target component and a second component that is classified as a second target component of the human-powered vehicle, and output information related to the first target component and second target component to the user of the human-powered vehicle, wherein
 the related information includes component information related to the first target component and the second target component,
 the component information includes at least one of information on a specification of the first target component and a model number of the first target component, and at least one of a specification of the second target component and a model number of the second target component,
 the component information further includes at least one of an assembling method for the model number of the first target component, an installing method for the model number of the first target component, a disassembling method for the model number of the first target component, an adjusting method for the model number of the first target component, and a replacement for the model number of the first target component, and at least one of an assembling method for the model number of the second target component, an installing method for the model number of the second target component, a disassembling method for the model number of the second target component, an adjusting method for the model number of the second target component, and a replacement for the model number of the second target component, and
 the first target component is a first kind of a bicycle component and the second target component is a second kind of the bicycle component, the first kind of the bicycle component being different from the second kind of the bicycle component.

2. The detecting device according to claim 1, wherein the control unit detects the first component and second component by executing a machine learning model, the machine learning model having been trained on a training data set during a training phase, and being configured at run-time to receive the first image as input, and in response, output first identification information that identifies the first target component and a first confidence value of the identification of the first component as the first target component and second identification information that identifies the second target component and a second confidence value of the identification of the second component as the second target component.

3. The detecting device according to claim 2, wherein a training computer trains the machine learning model using training data including labeled images, each of the labeled images including pixel data showing a part of the human-powered vehicle and being labeled with identification information of a target component shown in each of the images, the images having been collected through the Internet.

4. The detecting device according to claim 2, wherein a training computer trains the machine learning model using training data including rendered images generated by an application program of designs relating to at least one of a frame and the component of the human-powered vehicle, and identification information associated with a target component for each of the rendered images.

5. The detecting device according to claim 2, wherein a training computer trains the machine learning model using training data including a plurality of images obtained when at least one of a frame and the component of the human-powered vehicle is viewed from a plurality of different angles.

6. The detecting device according to claim 2, wherein the control unit, upon determining that the first confidence value or the second confidence value that is output from the learning model is equal to or less than a predetermined value, outputs a plurality of identification information candidates of the first or second component in descending order of the first confidence value or the second confidence value of each, receives a user selection of one of the plurality of the identification information candidates, and retrains the learning model by a fourth image labeled with the selected identification information candidate.

7. The detecting device according to claim 1, wherein the control unit outputs the related information and a second image featuring the first target component and second target component.

8. The detecting device according to claim 1, wherein the control unit outputs information on an installed state of the first target component and second target component detected in the human-powered vehicle.

9. The detecting device according to claim 1, wherein the first target component and second target component are two of a plurality of target components detected by the control unit in the first image, and the control unit outputs information on a matching state among the plurality of target components as the related information.

10. The detecting device according to claim 1, wherein
the first component is a frame of the human-powered vehicle, and
the control unit detects the frame as the first target component in the first image.

11. The detecting device according to claim 10, wherein the control unit outputs the related information and a third image featuring the first target component.

12. The detecting device according to claim 10, wherein the control unit outputs information on an other component to be recommended in accordance with the first target component, and user information including at least one of physical information and attribute information of the user of the human-powered vehicle as the related information.

13. The detecting device according to claim 12, wherein the physical information includes information on a position of a joint of the user.

14. The detecting device according to claims 1, wherein the control unit outputs the related information as at least one of text data and graphical data.

15. The detecting device according to claim 1, further comprising a display unit that displays information output from the control unit.

16. The detecting device according to claim 15, wherein
the display unit accepts input of selecting the related information as related information to be selected, and
the control unit outputs detailed information of the related information to be selected.

17. The detecting device according to claim 15, wherein
the display unit is configured to receive a user selection of the first target component or the second target component in a second image, and
in response to the user selection, the control unit outputs information related to the first target component or the second target component.

18. The detecting device according to claim 1, further comprising a non-volatile storage device in communication with the processing circuitry, the non-volatile storage device being configured to store information output from the processing circuitry of the control unit.

19. The detecting device according to claim 18, wherein the control unit stores first identification information of the first target component and second identification information of the second target component in the storage device in association with the related information.

20. The detecting device according to claim 19, wherein the control unit outputs the first identification information of the detected first target component and second identification information of the detected second target component in association with the related information to an external device.

21. The detecting device according to claim 18, wherein the control unit stores first identification information of the first target component and second identification information of the second target component in the storage device in association with identification information of the user of the human-powered vehicle.

22. The detecting device according to claim 21, wherein the control unit outputs the first identification information of the detected first target component and second identification information of the detected second target component in association with the identification information of the user of the human-powered vehicle to an external device.

23. The detecting device according to claim 1, wherein the control unit outputs information for prompting the user to input the first image in accordance with a traveling history of the human-powered vehicle.

24. The detecting device according to claim 1, wherein the control unit outputs the first image in association with the traveling history of the human-powered vehicle to an external device.

25. The detecting device according to claim 1, wherein the control unit outputs the first image in association with traveling environment information indicating traveling environment of the human-powered vehicle to an external device.

26. The detecting device according to claim 1, wherein the component information includes at least the specification of the first target component and the specification of the second target component.

27. The detecting device according to claim 1, wherein the component information includes at least the model number of the first target component and the model number of the second target component.

28. A detection method executable by a processor, the method comprising:
    detecting a first component of a human-powered vehicle as a first target component and a second component of the human-powered vehicle as a second target component in a first image including at least a part of the human-powered vehicle; and
    outputting information related to the first target component and the second target component to a user of the human-powered vehicle, wherein
    the related information includes component information related to the first target component and the second target component,
    the component information includes at least one of information on a specification of the first target component and a model number of the first target component, and at least one of a specification of the second target component and a model number of the second target component,
    the component information further includes at least one of an assembling method for the model number of the first target component, an installing method for the model number of the first target component, a disassembling method for the model number of the first target component, an adjusting method for the model number of the first target component, and a replacement for the model number of the first target component, and at least one of an assembling method for the model number of the second target component, an installing method for the model number of the second target component, a disassembling method for the model number of the second target component, an adjusting method for the model number of the second target component, and a replacement for the model number of the second target component, and
    the first target component is a first kind of a bicycle component and the second target component is a second kind of the bicycle component, the first kind of the bicycle component being different from the second kind of the bicycle component.

29. A method for generating a learning model, the method comprising:
    creating training data obtained by labeling a plurality of first images each including at least a part of a human-powered vehicle with identification information of components of the human-powered vehicle, and
    generating a learning model based on the created training data that detects, in accordance with input of an image, a first component of to the human-powered vehicle as a first target component and a second component of the human-powered vehicle as a second target component in the image, and outputs information related to the first target component and the second target component, identification information of the first target component and the second target component, and a confidence value to a user of the human-powered vehicle, wherein
    the related information includes component information related to the first target component and the second target component,
    the component information includes at least one of information on a specification of the first target component and a model number of the first target component, and at least one of a specification of the second target component and a model number of the second target component,
    the component information further includes at least one of an assembling method for the model number of the first target component, an installing method for the model number of the first target component, a disassembling method for the model number of the first target component, an adjusting method for the model number of the first target component, and a replacement for the model number of the first target component, and at least one of an assembling method for the model number of the second target component, an installing method for the model number of the second target component, a disassembling method for the model number of the second target component, an adjusting method for the model number of the second target component, and a replacement for the model number of the second target component, and
    the first target component is a first kind of a bicycle component and the second target component is a second kind of the bicycle component, the first kind of the bicycle component being different from the second kind of the bicycle component.

30. A non-transitory computer-readable storage medium comprising instructions configured to be executed by a processor of a computer, the instructions including:
    detecting a first component of a human-powered vehicle as a first target component and a second component of the human-powered vehicle as a second target component in a first image including at least a part of the human-powered vehicle; and
    outputting information related to the first target component and the second target component to a user of the human-powered vehicle, wherein
    the related information includes component information related to the first target component and the second target component,
    the component information includes at least one of information on a specification of the first target component and a model number of the first target component, and at least one of a specification of the second target component and a model number of the second target component,
    the component information further includes at least one of an assembling method for the model number of the first target component, an installing method for the model number of the first target component, a disassembling method for the model number of the first target component, an adjusting method for the model number of the first target component, and a replacement for the model number of the first target component, and at least one of an assembling method for the model number of the second target component, an installing method for the model number of the second target component, a disassembling method for the model number of the second target component, an adjusting method for the model number of the second target component, and a replacement for the model number of the second target component, and the first target component is a first kind of a bicycle component and the second target component is a second kind of the bicycle component, the first kind of the bicycle component being different from the second kind of the bicycle component.

* * * * *